(12) United States Patent
Sadler et al.

(10) Patent No.: US 8,054,598 B1
(45) Date of Patent: Nov. 8, 2011

(54) NEGOTIATING CAPACITY ALLOCATION AMONG DISTRIBUTED CURRENT PROTECTION DEVICES

(75) Inventors: Chris Sadler, Mountain View, CA (US); Xiaobo Fan, Sunnyvale, CA (US); Selver Corhodzic, Santa Clara, CA (US)

(73) Assignee: Exaflop LLC, Mountain View, CA (US)

( * ) Notice: Subject to any disclaimer, the term of this patent is extended or adjusted under 35 U.S.C. 154(b) by 468 days.

(21) Appl. No.: 12/355,573

(22) Filed: Jan. 16, 2009

(51) Int. Cl.
*H02H 7/00* (2006.01)

(52) U.S. Cl. ......................................... 361/63
(58) Field of Classification Search ............... 361/63
See application file for complete search history.

(56) References Cited

U.S. PATENT DOCUMENTS

| | | | | |
|---|---|---|---|---|
| 4,814,932 | A | * | 3/1989 | Morelli ........................... 361/63 |
| 5,604,385 | A | * | 2/1997 | David ............................. 307/52 |
| 6,018,203 | A | * | 1/2000 | David et al. ..................... 307/52 |

OTHER PUBLICATIONS

Fan, et al "Power Provisioning for a Warehouse-sized Computer" *In Proceedings of the ACM International Symposium on Computer Architecture*, San Diego, CA Jun. 2007.

Femal, et al. "Safe Overprovisioning: Using Power Limits to Increase Aggregate Throughput" *Department of Computer Science North Carolina State University*. 2005.

Lefurgy, et al. "Server-level Power Control" *Fourth International Conference on Autonomic Computing (ICAC 2007)*.

Filani, et al. "Dynamic Data Center Power Management: Trends, Issues, and Solutions" *Intel Technology Journal* vol. 12, Issue, (Feb. 21, 2008).

"Smart Fridges stay cool by talking to each other" *Commonwealth Scientific and Industrial Research Organisation. 1-4.* Jan. 13, 2009.

* cited by examiner

*Primary Examiner* — Stephen W Jackson
(74) *Attorney, Agent, or Firm* — Fish & Richardson P.C.

(57) ABSTRACT

Exemplary systems, apparatus, and methods relate to a current limiting device on each of two or more load branches that limits the current drawn by each load branch to a branch current allocation for that branch, where each of the current limiting devices is configured to automatically communicate messages to negotiate adjustments to the branch current allocations among each of the load branches while maintaining the sum of the branch allocations substantially at or below an available capacity of the supply branch. In an exemplary embodiment, a system of intelligent power modules (IPMs) may operate together to automatically negotiate capacity sharing among a number of load branches by adapting to the dynamic load conditions in order to takes improved advantage of infrastructure power handling capability without exceeding a predetermined capacity of the supply branch.

18 Claims, 14 Drawing Sheets

NEGOTIATING CAPACITY ALLOCATION AMONG DISTRIBUTED CURRENT PROTECTION DEVICES

TECHNICAL FIELD

Various embodiments relate generally to electrical power distribution.

BACKGROUND

In general, power distribution systems receive high voltage and/or high current electrical power from a utility provider, generator station, or other source of power. The power distribution systems may transform the received power to electrically powered equipment, such as the computers and cooling equipment in a data center. Electrical power is generally conducted by high current conductors that may be split into two or more branch conductors to divide and distribute electrical power. Some of these branches may be split to further divide and distribute electrical power. Each of the electrical conductors may be protected by circuit breakers, and/or other over-current protection devices to stop the flow of electrical currents in excess of the conductors' ratings.

Electrical devices are generally rated for a maximum current draw, and in some instances these ratings can be somewhat conservative. In addition, the electrical devices may only occasionally, if ever, draw their rated currents. In some instances, power distribution systems can be conservatively built to supply the devices' rated currents. The collective power of the devices connected to branches of the power distribution system may remain conservatively below the breaker limit for their respective branch, and the attached devices may not be drawing their maximum amount of power simultaneously. Overall, a power distribution system may leave some portion of the available power unused, and the amount of unusable power may increase as the number of power branches increases.

SUMMARY

Exemplary systems, apparatus, and methods relate to a current limiting device on each of two or more load branches that limits the current drawn by each load branch to a branch current allocation for that branch, where each of the current limiting devices is configured to automatically communicate messages to negotiate adjustments to the branch current allocations among each of the load branches while maintaining the sum of the branch allocations substantially at or below an available capacity of the upstream supply branch. In an exemplary embodiment, a system of intelligent power modules (IPMs) may operate together to automatically negotiate capacity sharing among a number of load branches by adapting to the dynamic load conditions in order to take improved advantage of infrastructure power handling capability without exceeding a predetermined capacity of the supply branch.

In one illustrative example, a current limiting device dynamically allocates current based on negotiation among a plurality of current limiting devices in a system with a predetermined level from a supply branch. The current limiting device includes a processor; a communication module to automatically communicate messages to negotiate adjustments to the branch current allocations among each of the load branches while maintaining the sum of the branch allocations substantially at or below an available capacity of the supply branch; a current interrupt module, wherein the current interrupt module senses a level of current through the current limiting device, and wherein the current interrupt module limits the current to an allocation setting; and a memory, wherein the memory contains instructions that, when executed by the processor, perform operations to allocate current to a specified branch. The operations include receiving a first allocation value, wherein the first allocation value is stored as the allocation setting; receiving a request from a requesting current limiting device of the plurality of current limiting devices to reallocate allocation settings among the plurality of current limiting devices where the request to available excess capacity in the specified branch being controlled by the current limiting device; determining whether to allocate a portion of the available excess capacity in the branch of the current limiting device to the requesting current limiting device; generating a response message indicating an amount of excess capacity to allocate to the requesting current limiting device; and transmitting the response message to the communication module to the requesting current limiting device.

In another illustrative example, a current limiting device dynamically allocates current based on negotiation among a plurality of current limiting devices in a system with a predetermined level from a supply branch. The device includes a processor; a communication module to automatically communicate messages to negotiate adjustments to the branch current allocations among each of the load branches while maintaining the sum of the branch allocations substantially at or below an available capacity of the supply branch; a current interrupt module, wherein the current interrupt module senses a level of current through the current limiting device, and wherein the current interrupt module limits the current to an allocation setting; and a memory, wherein the memory contains instructions that, when executed by the processor, perform operations to allocate current to a specified branch. The operations include receiving a first allocation value, wherein the first allocation value is stored as the allocation setting; determining whether the sensed current level exceeds the allocation setting; requesting a reallocation of the allocation settings among the plurality of current where the plurality of current limiting devices control the available excess capacity in each branch; generating a request message indicating an amount of excess capacity to allocate to the current limiting device; and transmitting the request message to the communication module to the plurality of current limiting devices.

In still another illustrative example, a power distribution system dynamically allocates current based on negotiation among a plurality of current limiting devices in a system with a predetermined level from a supply branch. The system includes a predetermined power capacity available to divide among two independent circuit branches, wherein each branch includes a current protection module; each current protection module including: a processor; a communication module to automatically communicate messages to negotiate adjustments to the branch current allocations among each of the load branches while maintaining the sum of the branch allocations substantially at or below an available capacity of the supply branch; a current interrupt module, wherein the current interrupt module senses a level of current through the current limiting device, and wherein the current interrupt module limits the current to an allocation setting; and a memory, wherein the memory contains instructions that, when executed by the processor, perform operations to allocate current to a specified branch.

Various embodiments may yield one or more advantages. For example, when current through an IPM approaches full (e.g., 100%) utilization of its present capacity allocation, some embodiments may automatically generate a request message asking IPMs at peer and/or parent nodes to reallocate a portion of each of their present power capacities to the requesting IPM. During periods when the IPM has substantial unused allocated capacity (e.g., less than 50%), some IPMs may, for example, respond to request messages from other IPMs by negotiating to reallocate at least a portion of its capacity to other IPMs to automatically adapt to changing load conditions, thereby avoiding or delaying at least some load interruptions. This may be advantageous, for example, in reducing infrastructure costs through improved device utilization, including flexibly shifting capacity to meet peak load demands, for example. Delaying outages may yield advantages, for example, by permitting load management to react to changing loads by rerouting load demands (e.g., redirecting data traffic in a data center) to manage peak current demand and thereby substantially reduce or avoid interrupting electrical service. In some examples, IPMs may negotiate branch current allocations to protect the source node against current overloads that substantially exceed the source node's predetermined capacity limit.

The details of one or more embodiments are set forth in the accompanying drawings and the description below. Other features and advantages will be apparent from the description and drawings, and from the claims.

DESCRIPTION OF DRAWINGS

This document describes these and other aspects in detail with reference to the following drawings.

Like reference symbols in the various drawings indicate like elements.

DETAILED DESCRIPTION OF ILLUSTRATIVE EMBODIMENTS

Figure 1:
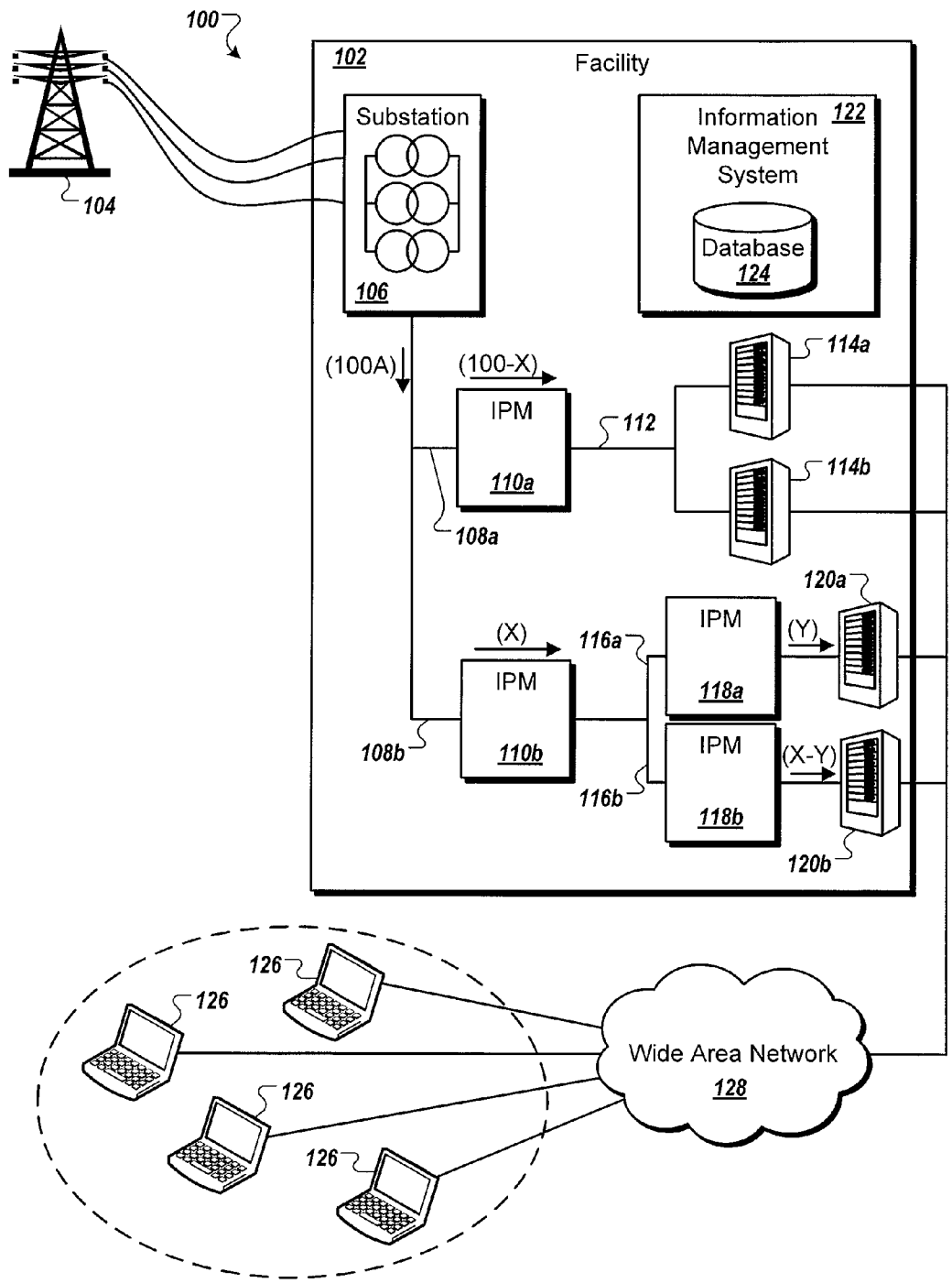
FIG. 1 shows an example power distribution system for the dynamic allocation of power capacity to power nodes.

FIG. 1 shows an example power distribution system 100 that includes dynamic allocation of power capacity to nodes in the system 100. The allocations for each node are configured to achieve improved utilization of electrical distribution infrastructure by allowing a network of current protection devices to intelligently negotiate power allocations in response to dynamic load conditions. For example, in the example depicted in FIG. 1, the power distribution system 100 includes a number of such power limiters, or intelligent protection modules (IPMs), that negotiate power allocations to dynamically shift capacity to route power needed by various load circuits under variable load conditions, while protecting the source node against overloads that would exceed the source node's predetermined capacity limit. For example, when current through an IPM approaches full (e.g., 100%, greater than 90%, greater than 85%) utilization of its present capacity allocation, the IPM may generate a request message asking IPMs at peer, parent, and/or child nodes to reallocate a portion of their present power capacity to the requesting IPM. Similarly, during periods when the IPM has unused allocated capacity (e.g., less than 100%, less than 50%, less than 25%, less than 10%), the IPM may, for example, respond to request messages from other IPMs by negotiating to reallocate at least a portion of its capacity to other IPMs. Accordingly, a number of IPMs can operate together to automatically negotiate a capacity sharing arrangement that adapts to the dynamic load conditions to achieve improved utilization of infrastructure power handling capability to distribute power to meet peak power demands at different loads.

The power distribution system 100 includes a facility 102 that receives high voltage and/or current power from an electrical utility provider 104. The facility 102 includes a power substation 106. The power substation 106 transforms the high voltage and/or current power into usable voltages and/or currents for electrical loads in the facility 102, and distributes the transformed power to a branch conductor 108a and a branch conductor 108b.

The branch conductor 108a includes an intelligent protection module (IPM) 110a, and the branch conductor 108b includes an IPM 110b. The IPM 110a provides over-current protection for a circuit 112 that supplies power to a server computer rack 114a and a server computer rack 114b. The IPM 110b provides over-current protection for a branch conductor 116a and a branch conductor 116b. The branch conductors 116a and 116b include an IPM 118a and 118b, respectively. The IPMs 118a and 118b provide over-current protection for a server computer rack 120a and a server computer rack 120b, respectively.

The IPMs 110a, 110b, 118a, and 118b, are able to vary their over-current protection trip points and can communicate with each other to allocate power from a shared supply. In some implementations, the IPMs 110a, 110b, 118a, and 118b can communicate in a peer-to-peer network. For example, the IPM 110a may send a message to the IPM 110b to request that the IPM 110b reduce its over-current protection trip point. If the request is granted, the IPM 110a may then raise its own trip point by a substantially like amount. In some implementations, the IPMs 110a, 110b, 118a, and 118b can communicate with an information management system 122 which includes a database 124. For example, the IPMs may communicate with the information management system 122 to request and/or receive power allocation settings, or to send and/or receive statuses, alarms, notifications, configurations, or other data that may be used by the IPMs 110b, 118a, and 118b. In some implementations, the information management system 122 can access the database 124 to store and retrieve information relating to the IPMs 110b, 118a, and 118b.

The server racks 114a, 114b, 120a, and 120b, serve information to a number of computers 126 via a wide area network (WAN) 128. In some implementations, the computers 126 can place varying computing loads upon the server computer racks 114*a*, 114*b*, 120*a*, and 120*b*. For example, the computer server racks 114*a* and 114*b* may host email services, and the server computer racks 120*a* and 120*b* may host video sharing services. Demand for these two different services can vary as the amount of traffic from the computers 126 varies. For example, demand for email services may increase in the daytime as users of the computers 126 access their email for work, but in the evening the demand for email services may decrease while the demand for video sharing services increases as people browse videos during their free time.

As the computing loads vary, electrical current needs of the server computer racks 114*a*, 114*b*, 120*a*, and 120*b* can vary as well. For example, during the day the computing loads placed upon the server computer racks 114*a* and 114*b* may cause the server computer racks 114*a* and 114*b* to draw 60 A of electrical power in order to operate, while the server computer racks 120*a* and 120*b* draw 20 A. At night, the server computer racks 114*a* and 114*b* may experience lower computing loads and therefore draw 40 A while the server computer racks 120*a* and 120*b* may experience increased computing loads and a 70 A draw.

The branch conductors 108*a* and 108*b* share a 100 amp supply. The intelligent protection module 110*b* is configured to allow a number of amperes of current, designated as "X", to pass onto the conductors 116*a* and 116*b*, and the intelligent protection module 110*a* is configured to allow the remaining number of amperes of current, designated by the value "100-X", to pass along the conductor 112. As the electrical current demand of the server computer racks 120*a* and 120*b* varies, the value of "X" can vary as well. For example, the loads connected to the IPM 110*b* may draw approximately 75 A, leaving approximately 25 A of capacity available for use by the loads connected to IPM 110*a* without exceeding the 100 A supply. Similarly, the server computer rack 120*a* may draw "Y" amps of current, leaving "X-Y" amps available for use by the server computer rack 120*b*.

In some implementations, by intelligently allocating capacity among the IPMs 110*a*, 110*b*, 118*a*, and/or 118*b*, electrical power utilization can increased without increasing the electrical supply capacity. For example, IPMs 110*a* and 110*b* can be initially allocated 50 A each while the server computer racks 114*a* and 114*b* are drawing 10 A each, the server computer racks 120*a* and 120*b* are drawing 20 A each, and the IPMs 118*a* and 118*b* may be allocated 25 A apiece. The IPM 110*a* has approximately 30 A of excess capacity (50 A−(2×10 A)=30 A), while the IPM 110*b* may have 10 A (50 A−(2×20 A)=10 A). As computing demands change, the server computer rack 120*a* may draw 40 A, exceeding the allocation given to the IPM 118*a*. In some implementations, the IPM 118*a* can request the IPM 118*b* grant some or all of its excess 5 A capacity. If granted, the IPM 118*b* can reduce its allocation to 20 A and the IPM 118*a* can increase its own allocation to 30 A.

In this example, the IPMs 118*a* and 118*b* have substantially maximized their use of the 50 A allocated to the IPM 110*b*. However, there remains a 10 A shortage along the branch conductor 116*a*. In some implementations, the IPM 110*a* can request and additional power allocation from the upstream IPM 110*b*. For example, the IPM 118*a* can request an additional 10 A allocation from the IPM 110*b*. However, in this example, the IPM 110*b* is already passing 50 A of its 50 A allocation. In some implementations, the IPM 110*b* can send a message to the IPM 110*a* to determine if the IPM 110*a* has any unused capacity that could be re-allocated to the IPM 110*b*.

For example, the IPM 110*b* may request a 10 A allocation from the IPM 110*a*. Since the IPM 110*a* has 30 A of excess capacity, the IPM 110*a* may lower its own allocation by 10 A and grant that allocation to the IPM 110*b*. The IPM 110*b* can then raise its allocation by 10 A to a total of 60 A, thereby satisfying the power needs of the server computer racks 120*a* and 120*b*, and increase the utilization of the 100 A available from the substation 106. Additional examples of intelligent power allocation are discussed in further detail in relation to FIGS. 2-9.

Figure 2:
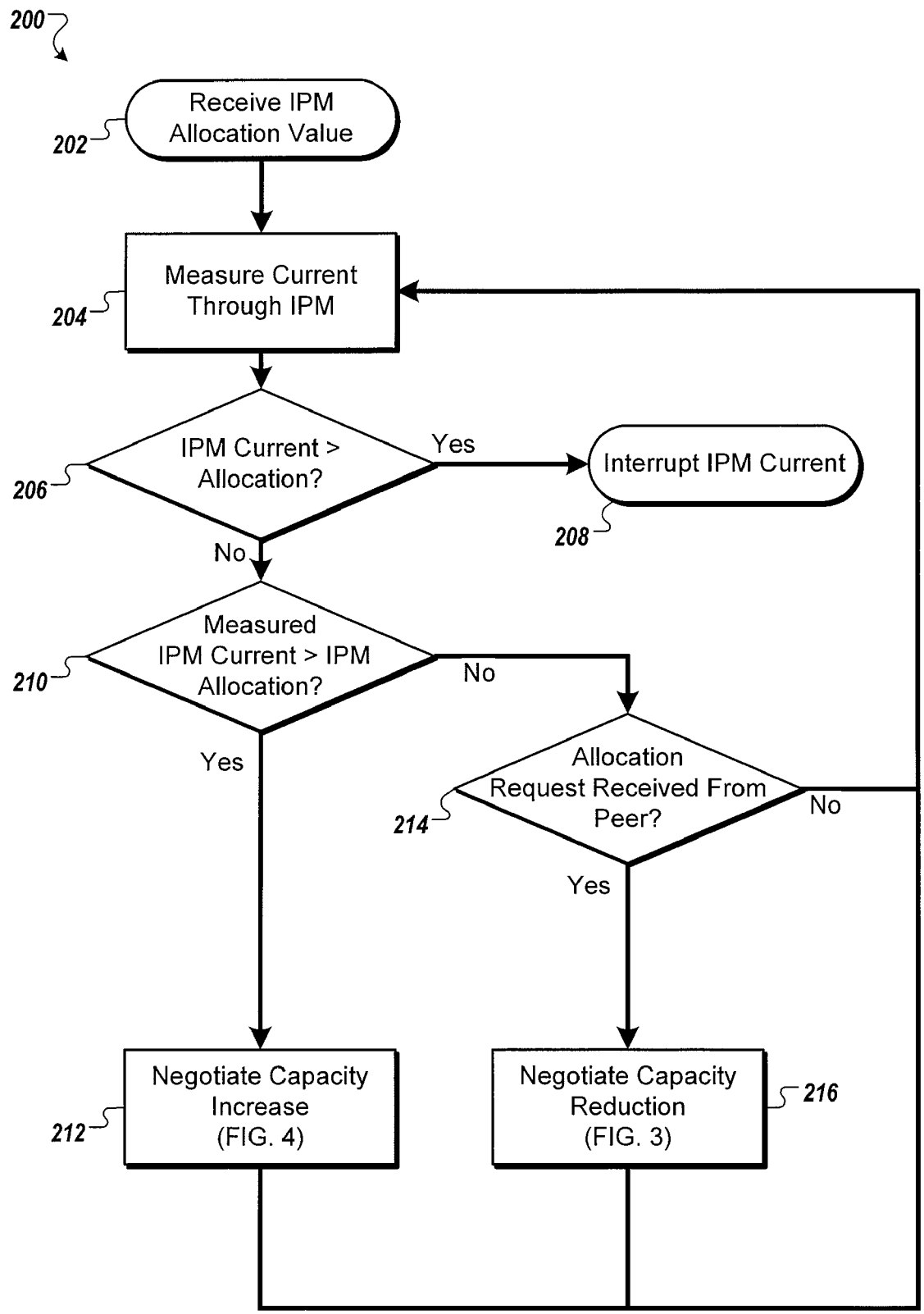
FIG. 2 is a flow diagram of an example intelligent power allocation process.

FIG. 2 is a flow diagram of an example intelligent power allocation process 200. The process begins when an intelligent protection module (IPM) (e.g., the IPM 110*a* of FIG. 1) receives a power allocation value 202. In some implementations, the allocation value can be received from a source internal to the IPM. For example, an allocation value can be received from a default startup value, an internally calculated value, a value determined from a lookup table, or other source of allocation values internal to the IPM. In some implementations, the allocation value is received from a source external to the IPM. For example, the allocation value can be received from a user, from a database (e.g., the information management system 122), from other IPMs, or from other external sources of allocation values.

After the allocation value is received 202, the electrical current that passes through the IPM is measured 204. The measured IPM current is compared to the maximum device rating of the IPM. For example, the IPM may carry a maximum amperage rating that represents the number of amps that the IPM can carry before the IPM experiences physical damage.

If the IPM current is determined 206 to be greater than the present allocation, then the IPM current is interrupted 208. In some implementations, interrupting the IPM current can prevent the IPM, or other devices or components connected to the IPM's circuit, from being damaged do to an over-current condition.

In some implementations, a message can be sent to other IPMs or to an information management system to update them of the current interruption 208. For example, an upstream IPM can notify downstream IPMs of the current interruption 208, and the downstream IPMs can respond by reducing their own allocations or interrupting their own currents to reduce the total current load that can be placed upon the upstream IPM to a level below the upstream IPM's maximum device rating.

In another example, the information management system can be notified of the current interruption 208, and the information management system can respond by alerting technicians to rectify the over-current condition, by automatically reducing the computing loads assigned to server computer racks (e.g., the computer server racks 114*a*, 114*b*, 120*a*, and 120*b* of FIG. 1) thereby reducing the racks' current draws, or by responding in other ways to rectify the conditions which caused the over-current to pass through the IPM. In some implementations, the current interruption 208 may be reversed. For example a technician can manually reset the IPM current protection components, or a message from the information management system or another IPM may signal the IPM to reset the current interruption 208.

If the IPM current is determined 206 to be less than or equal to the present allocation, then the measured IPM current is compared to the IPM's allocation. If the IPM current is determined 210 to be greater than the IPM's allocation, then a capacity increase is negotiated 212. In some implementations, the IPM can increase its own capacity by requesting and receiving additional electrical current allocations from other IPMs. An example process for negotiation of a capacity increase is discussed in the description of FIG. 4.

If the IPM current is determined 210 to be equal to or less than the IPM's allocation, then a determination 214 is made in response to the receipt of an allocation request from a peer. If no allocation request is determined 214 to have been received from a peer, then the process 200 measures 204 current passing through the IPM.

If an allocation request is determined 214 to have been received from a peer, then a capacity reduction is negotiated 216. In some implementations, the IPM can reduce its own capacity in response to a request from other IPMs. An example process for negotiation of a capacity reduction is discussed in the description of FIG. 3.

Figure 3:
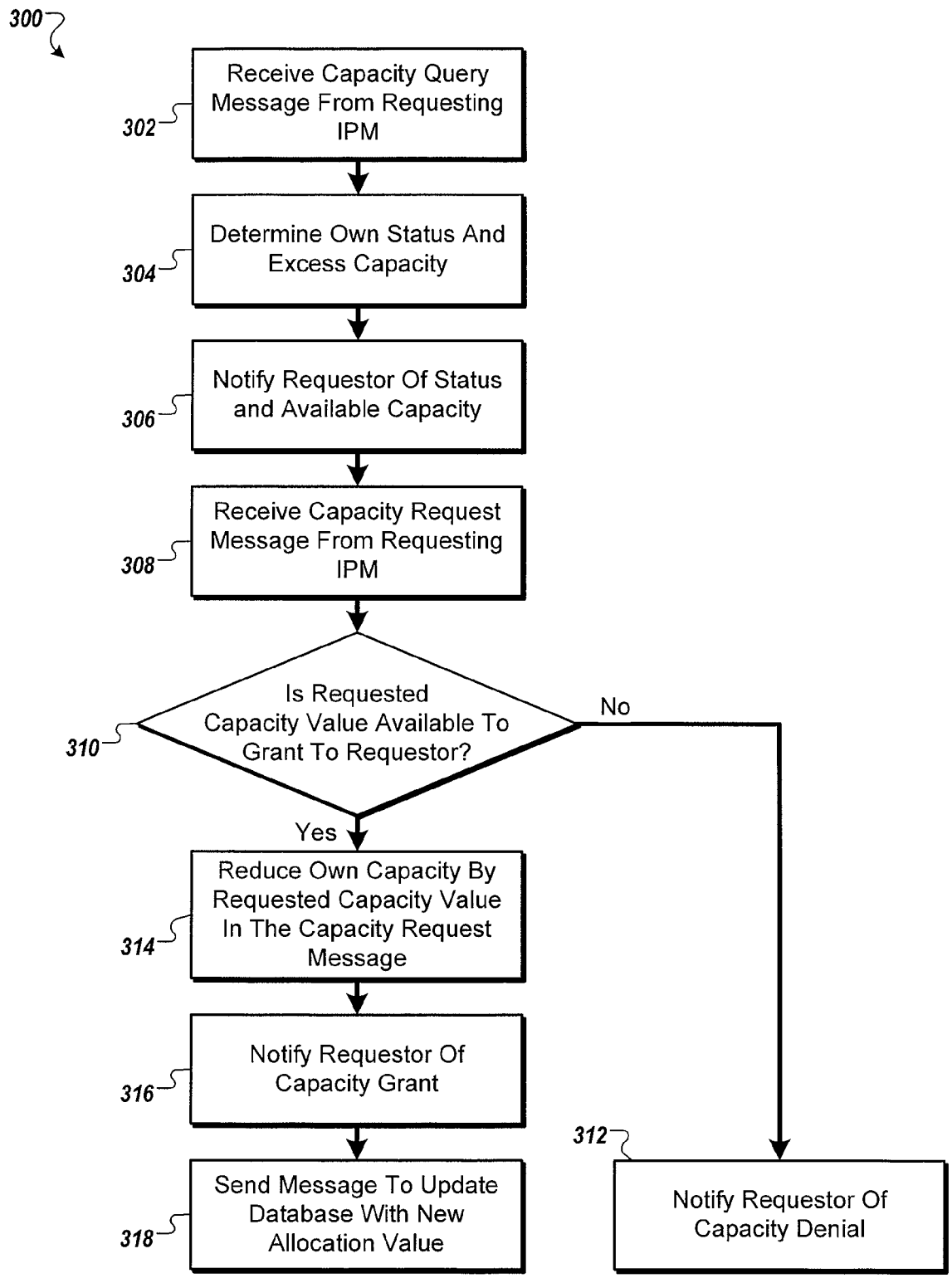
FIG. 3 is a flow diagram of an example capacity reduction negotiation process.

FIG. 3 is a flow diagram of an example capacity reduction negotiation process 300. In some implementations, the process 300 may be the capacity negotiation process illustrated by step 216 of FIG. 2. The process 300 begins when a capacity query message from a requesting IPM is received 302. The IPM determines 304 its own status and excess capacity. For example, status information can include electrical current measurements, device ratings, present allocation settings, load variability information, load trend information, and/or other information that can describe the status of an IPM.

The requestor is then notified 306 of the status and available capacity. The requestor can use the notification 306 to determine if a request for capacity should be sent. This determination is discussed in the description of FIG. 4.

A request message for capacity is received 308 from the requesting IPM. If the requested capacity value is determined 310 to be unavailable to grant to the requestor, then the requestor is notified 312 of the capacity denial. Otherwise, if the requested capacity value is determined 310 to be available to grant to the requestor, then the IPM reduces 314 its own capacity by the requested capacity value in the capacity request message, and sends a message to notify 315 the requestor of the capacity grant. In some examples, the IPM may have more excess capacity than is being requested, and the IPM may respond by reducing 314 its own allocation by the requested capacity value and notifying 316 the requestor that it may increase its allocation by the requested amount. In some examples, the IPM can have less excess capacity than is being requested, and the IPM can respond by reducing 314 its own allocation by an amount substantially equal to its excess capacity, and notifying 316 the requestor of the allocation that the IPM has granted.

In some implementations where the IPM has interrupted the current flowing though the IPM, such as in step 208 of FIG. 2, the IPM can make substantially its entire allocation available for other IPMs. For example, the IPM can be allocated 50 A but if the current path has been interrupted the IPM passes zero amps, giving the IPM 50 A of excess capacity while the current is interrupted. The IPM can grant some or all of the excess capacity to other IPMs when requested to do so, thereby increasing the utilization of that available capacity. In some implementations, the IPM can negotiate an excess capacity before closing the breaker. For example, the IPM can be allocated 50 A but the IPM can request an additional 20 A. Once the 70 A excess capacity is reached, the IPM can close the breaker.

Figure 4:
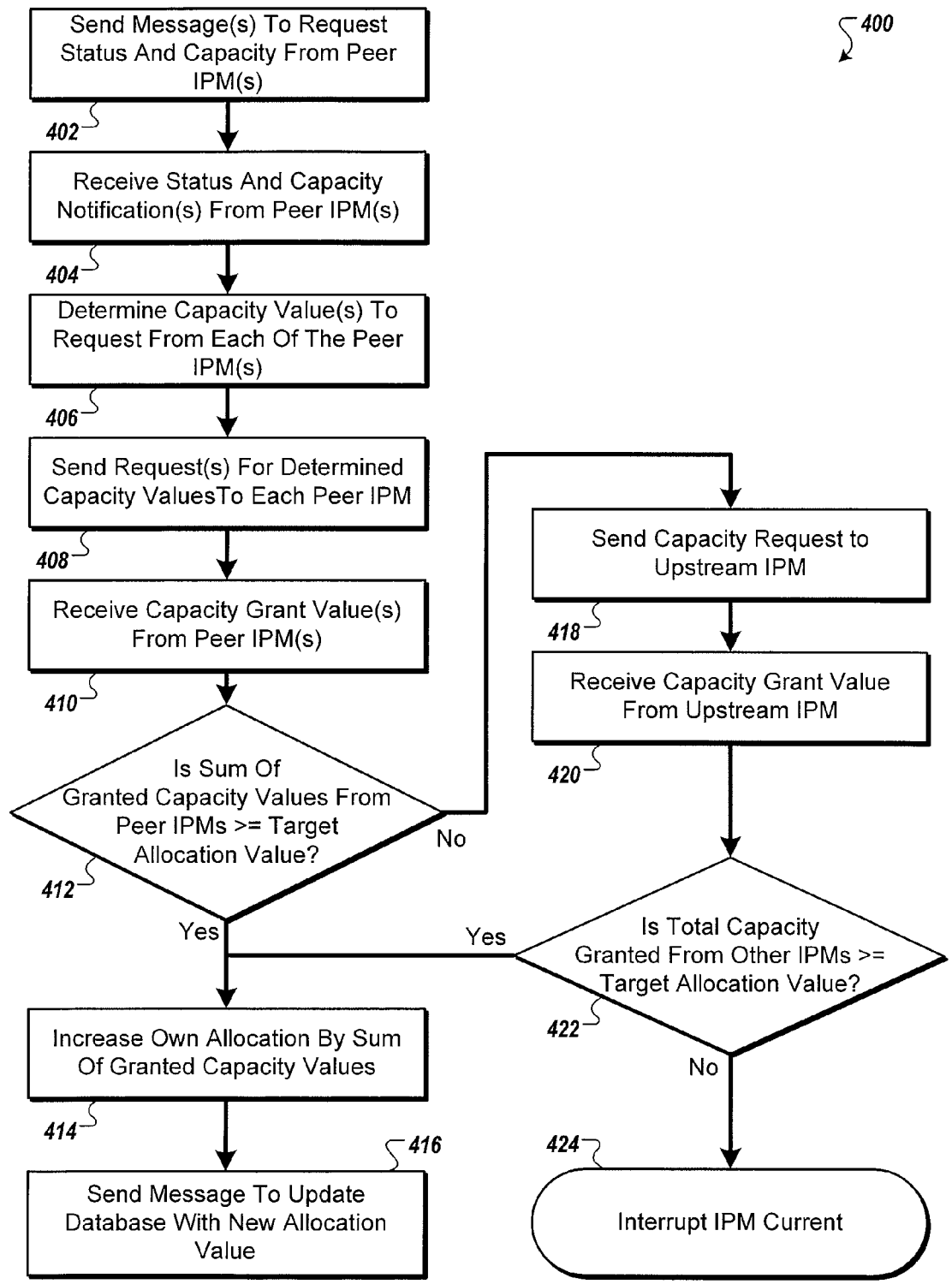
FIG. 4 is a flow diagram of an example capacity increase negotiation process.

FIG. 4 is a flow diagram of an example capacity increase negotiation process 400. In some implementations, the process 400 may be the capacity negotiation process illustrated by step 212 of FIG. 2. The process 400 begins when an IPM sends a message 402 to request status and capacity data from one or more peer IPMs. The IPM receives 404 one or more status and capacity notifications from peer IPMs. For example, status information can include electrical current measurements, device ratings, present allocation settings, time-temperature trip profile information, load variability information, load trend information, and/or other information that can describe the status of an IPM.

The IPM determines 406 one or more capacity values to request from one or more peer IPMs and sends 408 requests for the determined capacity values to each peer IPM. In some implementations, the requesting IPM can determine 406 that a single peer IPM can allocate substantially all of the capacity needed by the requesting IPM. For example, the requesting IPM may need an additional 20 A of capacity, and a single peer IPM may have 25 A of excess capacity. The requesting IPM can request 408 substantially all of the needed additional 20 A from the single peer, leaving the peer with 5 A excess capacity.

In some implementations, the requesting IPM can determine 406 that two or more peer IPMs can jointly allocate substantially all of the capacity needed by the requesting IPM. For example, the requesting IPM may need an additional 35 A of capacity. A first peer IPM may have 30 A of excess capacity, and a second peer IPM may be 25 A of excess capacity. The requesting IPM can determine to 406 request 408 20 A from the first peer IPM and 15 A from the second peer IPM. The requested 408 allocations can be combined to satisfy the requesting IPM's needed 35A, and leave the peer IPMs with 10 A of remaining excess capacity each.

The requesting IPM receives 410 capacity grant values from one or more peer IPMs. The requesting IPM then determines 412 if the sum of the capacities granted from the peer IPMs is greater than or equal to a target allocation value (e.g., the difference between the allocated and measured currents used in step 210 of FIG. 2). If the sum of the granted capacities is greater than or equal to the target allocation value, then the requesting IPM increases 414 its own allocation by the sum of the granted capacity values.

In some implementations, the requesting IPM can send 416 a message to update a database with the new allocation value. For example, the requesting IPM can notify an upstream IPM of the updated allocation value. In another example, the requesting IPM can notify an information management system (e.g. the information management system 122 of FIG. 1) to store or update information about the requesting IPM's status.

In some implementations, the sum of the granted capacities may be less that the current needed by the IPM. For example, the requesting IPM may request 15 A from its peers, but only receive 410 capacity grant values totaling 10 A. In some implementations, the requesting IPM may receive 410 no capacity grant values. For example, the IPM may receive no grants because the IPM has no peers, a communications link between the IPM and its peers may be unavailable, or none of the IPM's peers have excess capacity to grant. In these and other such examples, the IPM's sum of granted capacities can be considered to have the same effect as receiving 410 a grant value of 0 A.

If the sum of the granted capacities is determined 412 to be greater than or equal to the target allocation value, then the requesting IPM sends 418 a capacity request message to an upstream IPM, and the requesting IPM receives 420 a capacity grant value from the upstream IPM. The requesting IPM sums the total of the capacity grant values received 410 from peer IPMs with the capacity grant value received 420 from the upstream IPM. If the total capacity is determined 422 to be greater than or equal to the additional current needed by the requesting IPM, then the IPM increases its own allocation 414 by the sum of the granted capacity values.

If the total capacity is determined 422 to be less than the additional current needed by the requesting IPM, then the IPM interrupts 424 the current path. In some implementations, the requesting IPM may not receive a response from the upstream IPM. For example, the requesting IPM may have no upstream IPM, or communications between the requesting and upstream IPMs may be interrupted. In these and other such examples, the lack of response from the upstream IPM can be considered to have the same effect as receiving 420 a grant value of 0 A.

In some implementations, the requesting IPM can send a notification message when the current path is interrupted 424. For example, the requesting IPM can send a notification message to the information management system, to technicians (e.g., via a paging system, email), or to other personnel and/or systems to alert them to the current interruption 424.

In some implementations, the requesting IPM can make substantially all of its allocation available to other IPMs when the current path is interrupted 424. For example, the requesting IPM can be configured with an allocation of 50 A when the current is interrupted 424. The interrupted 424 path can carry no current, therefore substantially all of the requesting IPM's 50 A allocation can be considered to be excess current, and the requesting IPM can offer substantially all of this excess current if/when requested (e.g., the request 308 of FIG. 3) by another IPM.

In some implementations, the IPM can reduce its own allocation to more closely match a measured current draw. For example, the IPM may be configured with an allocation of 40 A while the measured current flow is 10 A, resulting in 30 A of excess capacity. The IPM can reduce its own allocation to 10 A, 12 A, or another value that reduces the excess capacity while still satisfying the measured current draw. In another example, the IPM may be configured with an allocation of 40 A but has interrupted 424 the current path resulting in an excess current of 40 A. The IPM can reduce its own allocation to substantially zero amps to more closely match the zero measured current flow.

In some implementations, the IPM can reduce its own allocation upon request from a user or a peer, or do so automatically on a timed interval (e.g., every minute, hourly, daily). In some implementations, the IPM can automatically reduce its own allocation in response to an excess current threshold. For example, when measured current drops, excess current goes up. The IPM can be configured to automatically reduce its own allocation to the measured amount or to a reduced value that is higher than the measured current (e.g., to leave a 5% excess capacity margin).

In some implementations, a downstream IPM can notify an upstream IPM when the downstream IPM reduces its own capacity. For example, the upstream IPM can be allocated 50 A to supply a first downstream IPM's 25 A draw and a second IPM's 25 A draw. If the first IPM reduces its allocation by 10 A, it may notify the upstream IPM of the reduction, in essence, giving the upstream IPM 10 A of excess capacity. In some implementations, the upstream IPM can retain some or all of the excess capacity. For example, by retaining excess capacity, the upstream IPM may be able to more quickly redistribute allocations among peer IPMs when requested to do so.

In some implementations, the upstream IPM can detect excess capacity and request allocations from downstream IPMs so excess capacity is moved closer to the current source. For example, an upstream IPM can sense that it has 40 A of excess capacity (e.g., the downstream IPMs may not be drawing their allocated currents). The upstream IPM can request allocations from the downstream IPMs, and reduce its own allocation by and amount equal to or less than the sum of the granted allocations.

In some implementations, the upstream IPMs can reduce their own allocations to migrate excess capacity closer to the current source. For example, an IPM can reduce its own allocation, thereby allowing its parent IPM to reduce its own allocation, thereby allowing its grandparent IPM to reduce its own allocation, and so on. This reverse "trickle down" process can have the effect of pushing excess capacity closer to the current source and consolidating the excess capacity within IPMs that are closer to the top of an IPM hierarchy. In some implementations, by consolidating excess capacity closer to the current source, excess capacity originating in one branch of the IPM hierarchy and be re-allocated more quickly to IPMs in another branch.

Figure 5:
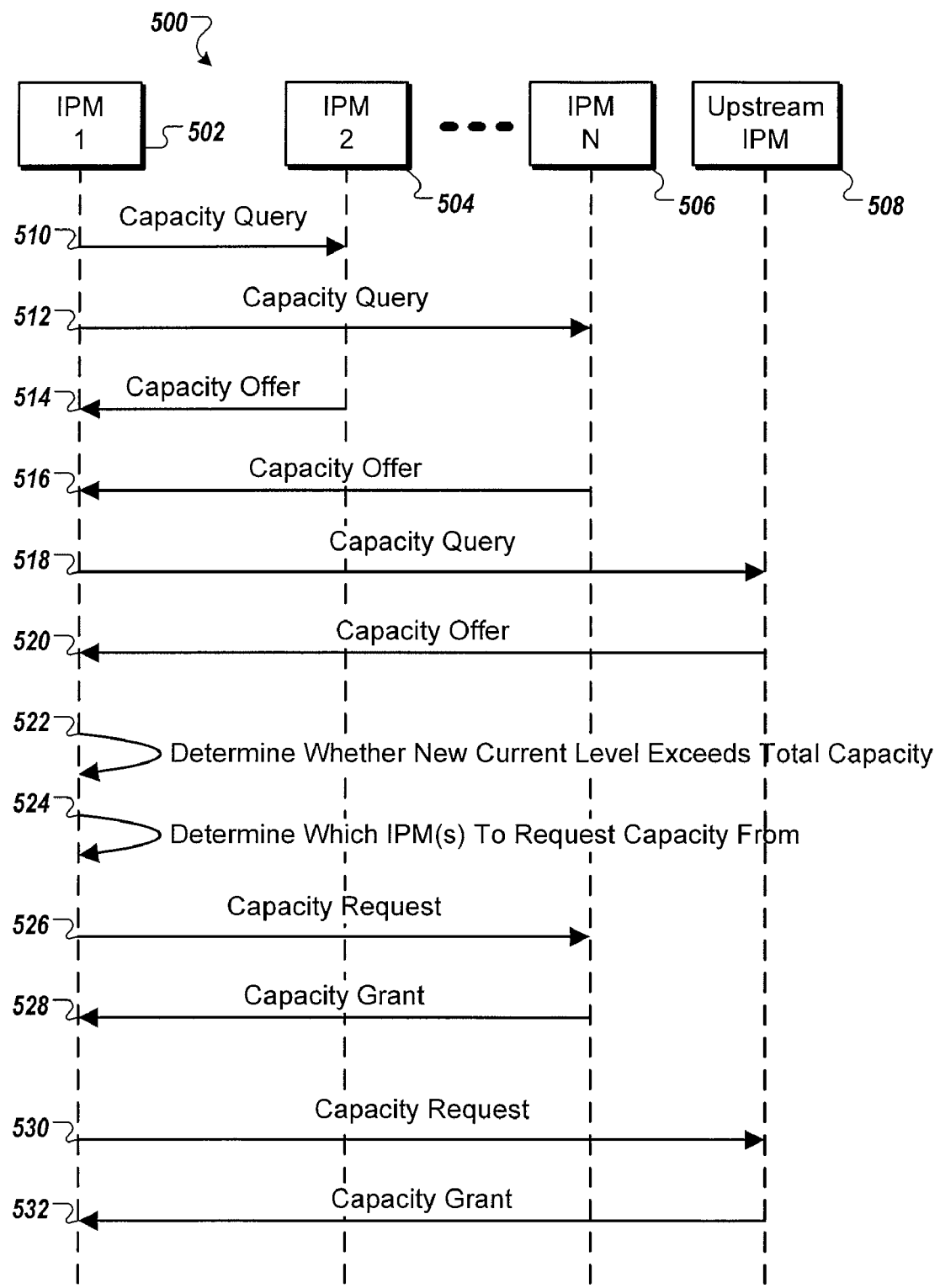
FIG. 5 depicts an example peer-to-peer interaction among intelligent protection modules for the dynamic allocation of power capacity to power nodes.

FIG. 5 is depicts an example peer-to-peer interaction 500 among intelligent protection modules for the dynamic allocation of power capacity to power nodes. In some implementations, IPMs can negotiate distributions of power allocations in a peer-to-peer manner (e.g., without an information management system or central controller). In the illustrated example, a first peer IPM 502 needs to obtain additional power capacity allocations. The first peer IPM sends a capacity query 510 to a second peer IPM 504, and sends a capacity query 512 to an Nth peer IPM 506. For the purposes of this example, the second peer IPM 504 and the Nth peer IPM 506 represent the first and last members of a collection of peer IPMs. In some implementations, the first peer IPM 502 can interact with any member of this collection in a manner substantially similar to the interactions it has with IPMs 504 and 506.

The second peer IPM 504 responds with a capacity offer 514. In some implementations, the capacity offer can be some or all of the second IPM's 504 excess capacity. The Nth peer IPM 506 also responds with a capacity offer 516 that represents an amount of excess capacity that the Nth peer IPM has available for allocation to other IPMs. In some implementations, the first peer IPM 502 can interact with the peer IPMs 504-506 to obtain power allocation it needs by obtaining allocations from its peers. In some implementations, by obtaining allocations from peers, the total current allocation given to the peer IPMs 502-506 can remain substantially unchanged.

The first peer IPM 502 also sends a capacity query 518 to an upstream IPM 508. In some implementations, the first peer IPM 502 can request a power allocation from the upstream IPM 508 when the peer IPMs 504-506 do not have enough excess capacity to satisfy the first peer IPM's 502 requirements. The upstream IPM 508 responds be sending a capacity offer 520 of its own.

The first peer IPM 502 uses the capacity offers 514-516 and 520 to determine 522 whether the new total current level exceeds total capacity. In some implementations, the total capacity can be the rated capacity of the first peer IPM. In some implementations, the total capacity can be the allocated and/or rated capacity of the upstream IPM 508. In some implementations, if the new current level exceeds the total capacity, then the first peer IPM 502 can interrupt its current path to prevent an over-current condition.

The first peer IPM 502 uses the capacity offer 514-516 and 520 to determine 524 which of the IPMs 504-508 to request capacity from. In the illustrated example, the first peer IPM 502 determines 524 to request capacity from the Nth IPM 506 and the upstream IPM 508. The first peer IPM 502 sends a capacity request 526 to the Nth peer IPM 506, and receives a capacity grant 528 for a portion of the needed capacity. The first peer IPM 502 then sends a capacity request 530 to the upstream IPM 508 for substantially the remainder of the needed capacity, and receives a capacity grant 532.

Figure 6:
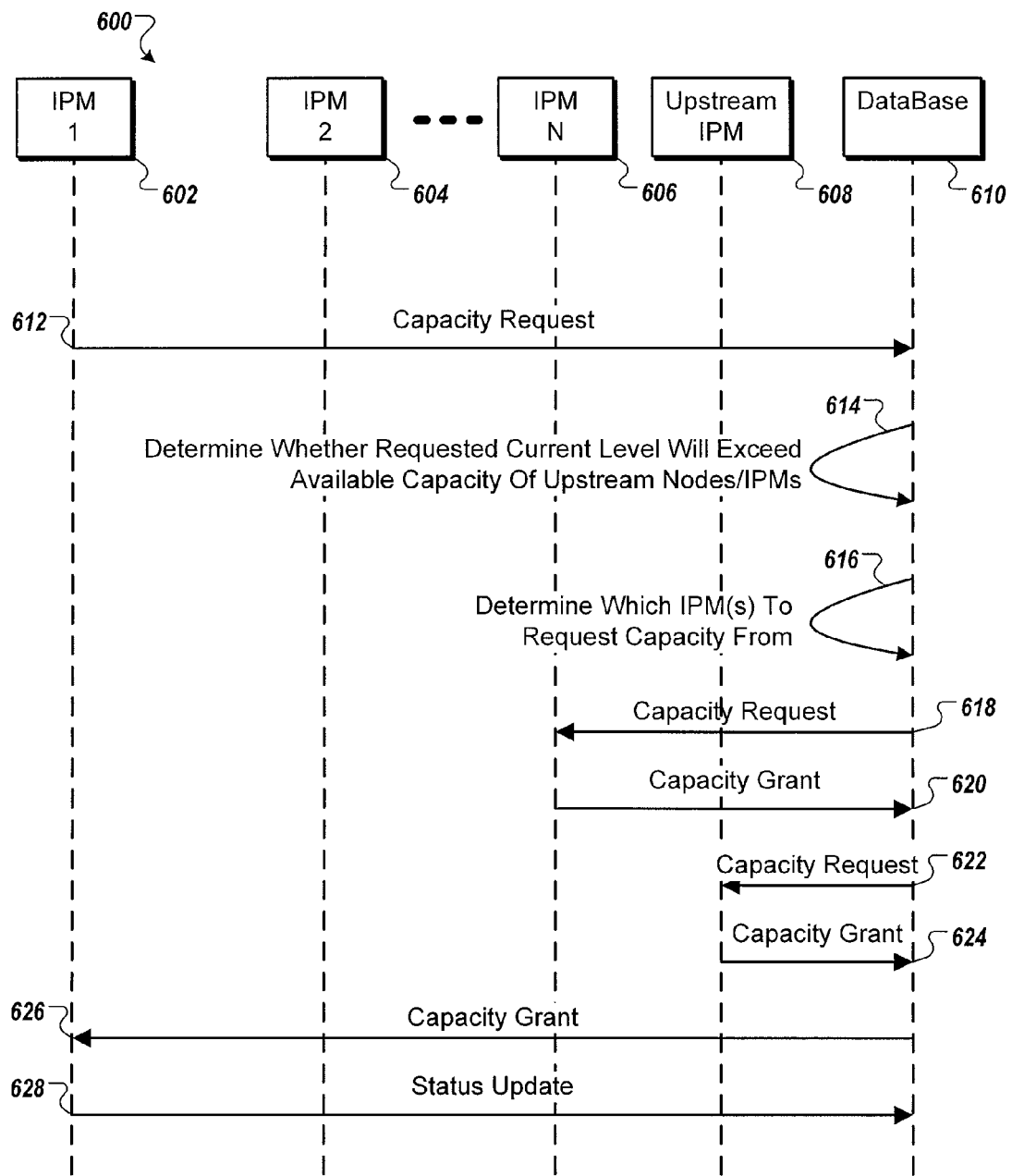
FIG. 6 depicts an example centralized interaction of intelligent protection modules for the dynamic allocation of power capacity to power nodes.

FIG. 6 is an example centralized interaction 600 of intelligent protection modules for the dynamic allocation of power capacity to power nodes. In some implementations, a database 610 can organize the distribution of power allocations among IPMs.

In the illustrated example, a first IPM 602 needs to obtain additional power capacity allocations. The first IPM 602 sends a capacity request 612 to the database 610. In some implementations, the database 610 may be the information management system 122 of FIG. 1. For example, in response to the capacity request 612 the database 610 can query an internal table of current measurement and/or status information obtained from a second IPM 604 though an Nth IPM 606, as well as an upstream IPM 608 which supplies power to the IPMs 602-606.

The database 610 determines 614 if the requested current level will exceed available capacity. For example, the capacity request 612 may be in excess of the upstream IPM's 608 device rating. The database 610 may deny the request 612 to prevent the upstream IPM 608 from an over-current condition.

If the capacity request 612 is determined 614 to be less than the available capacity, then the database 610 determines 616 which IPMs to request capacity allocations from. In the illustrated example, the database 610 determines 616 that allocations from the Nth IPM 606 and the upstream IPM 608 can be combined to grant the capacity request 612. The database 610 sends a capacity request 618 to the Nth IPM 606, and the Nth IPM 606 responds with a capacity grant 620. The database 610 then sends a capacity request 622 to the upstream IPM 608. The upstream IPM 608 replies by sending a capacity grant 624 to the database 610.

In some implementations, capacity grants can cause the database 610 to update its records of IPM statuses. For example, receipt of the capacity grants 620 and 624 can trigger the database 610 to update its tables with the post-grant allocations of the IPM's 606 and 608.

In the illustrated example, the database 610 then sends a capacity grant 626 to the first IPM 602, and the first IPM 602 responds by sending a status update 628. In some implementations, the database 610 may use the status update 628 as a confirmation message that the capacity grant 626 was successfully received, and/or the database 610 may use the status update 628 to update its records of the first IPM's 602 status.

In some implementations, a distribution system for the dynamic allocation of power capacity to power nodes (e.g., the system 100 of FIG. 1) can switch among the interactions 500, 600, and/or other power allocation negotiation processes. For example, the system 100 can operate initially using the centralized interaction 600, but if the information management system 122 becomes unavailable (e.g., server malfunction, network outage, server maintenance downtime), the system can switch over to the peer-to-peer interaction 500 for continuing operations. When the information management system 122 becomes available again, the system 100 can revert back to the centralized interaction 600. An example combination of peer-to-peer and centrally coordinated interactions is described in the illustration and description of FIG. 7.

Figure 7:
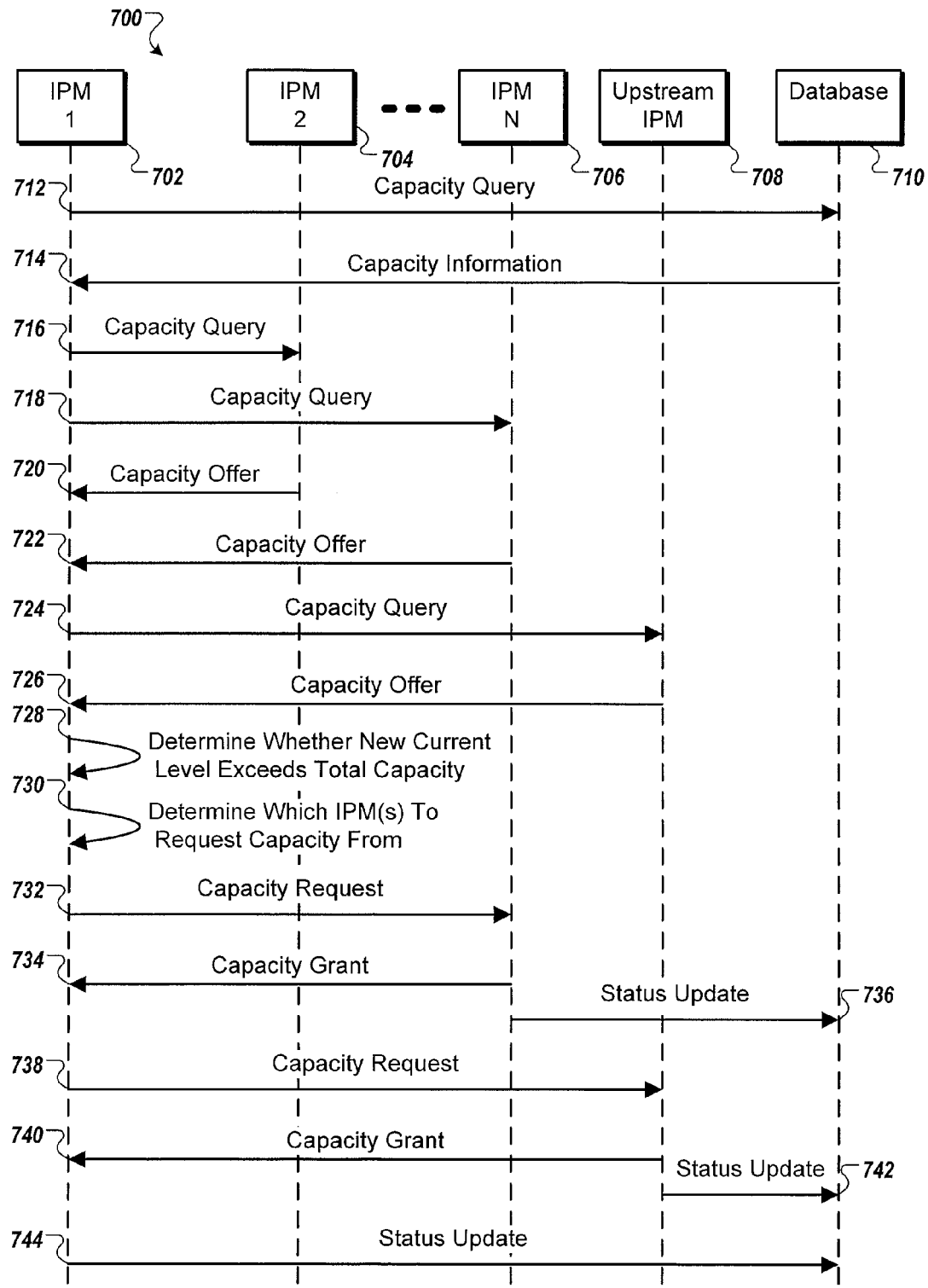
FIG. 7 depicts an example combination of centralized and peer-to-peer interaction of intelligent protection modules for the dynamic allocation of power capacity to power nodes.

FIG. 7 depicts a combination of centralized and peer-to-peer interactions 700 of intelligent protection modules for the dynamic allocation of power capacity to power nodes. In some implementations, initial requests for power allocations within a power distribution system (e.g., the system 100 of FIG. 1) may be directed to a database (e.g., the information management system 122) to determine which IPMs have excess capacity, and the requesting IPM can use that excess capacity information to directly query the IPMs that have capacity available for reallocation. In some implementations, the combined interactions 700 can provide the power distribution system with fault-tolerance against a centralized point of failure. For example, a failure of the database can cause the IPMs to interact in a peer-to-peer manner so allocation negotiation can continue until the failure is rectified.

In the illustrated example, a first IPM 702 needs to obtain additional power capacity allocations. The first IPM 702 sends a capacity query 712 to a database 710. The database 710 responds by sending capacity information 714 back to the first IPM 702. In some implementations, the capacity information may include information about the excess capacities of some, all, or none of the first IPM's 702 peers. For example, the capacity information 714 can include capacity information about every IPM connected to the first IPM (e.g., its parent IPM, child IPMs) as well as peer IPMs, such as a second IPM 704 through an Nth IPM 706. In another example, the capacity information 714 can include information about only those IPMs that the database 710 has identified as having excess capacity that the first IPM 702 can request.

The first IPM 702 sends a capacity query 716 to the second IPM 704, and sends a capacity query 718 to the Nth IPM 706. The second IPM responds with a capacity offer 720, and the Nth IPM 706 responds with a capacity offer 722. In the illustrated example, the capacity offers may not satisfy the first IPM's requirements, so a capacity query 724 is sent to the upstream IPM 708. The upstream IPM 708 responds by sending a capacity offer 726.

The first IPM 702 determines 728 whether the new current level exceeds a total capacity (e.g., the total available capacity, the device rating of the first IPM 702, the device rating of the upstream IPM 708). In some implementations, if the new current level is determined 728 to exceed the total capacity, then the first IPM 702 can interrupt the current path.

In some implementation, the first IPM 702 can use the capacity information to query only the IPMs 704-706 and 708 that have excess capacity available. In some implementations, the first IPM 702 may not receive the capacity information 714 (e.g., due to a communications failure or database outage), and respond by sending the capacity queries 716-720 and 724 to all the connected and peer IPMs 704-706 and 708.

The first IPM 702 then determines 730 which of the IPMs 704-706 and 708 to request capacity from. In the illustrated example, the first IPM 702 has determined that it will attempt to negotiate with the Nth IPM 706 and the upstream IPM 708 to obtain the additional capacity it needs. A capacity request 732 is sent to the Nth IPM, and a capacity grant 734 is returned. The Nth IPM 706 also sends a status update to the database 710 to notify the database 710 of the Nth IPM's 706 reduced allocation.

A capacity request 738 is sent to the upstream IPM 708, and a capacity grant 740 is returned. The upstream IPM 708 also sends a status update 742 to the database 710 to notify the database 710 that the upstream IPM 708 has changed its allocation. The first IPM 702 then sends the database 710 a status update 744 of its own to notify the database 710 of the first IPMs increased allocation.

Figure 8A:
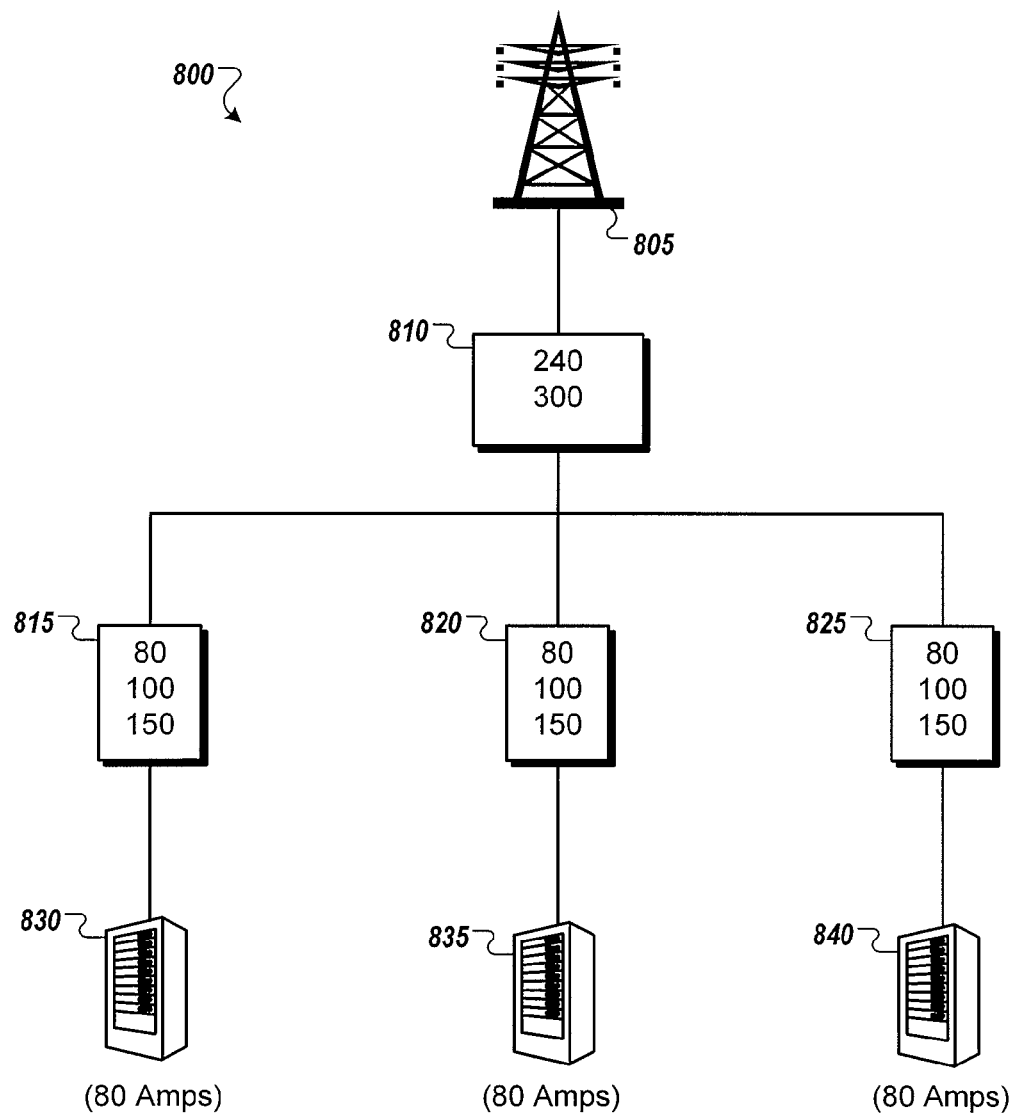
FIGS. 8A and 8B show an example power distribution system that dynamically allocates power due to changes in power load.
Figure 8B:
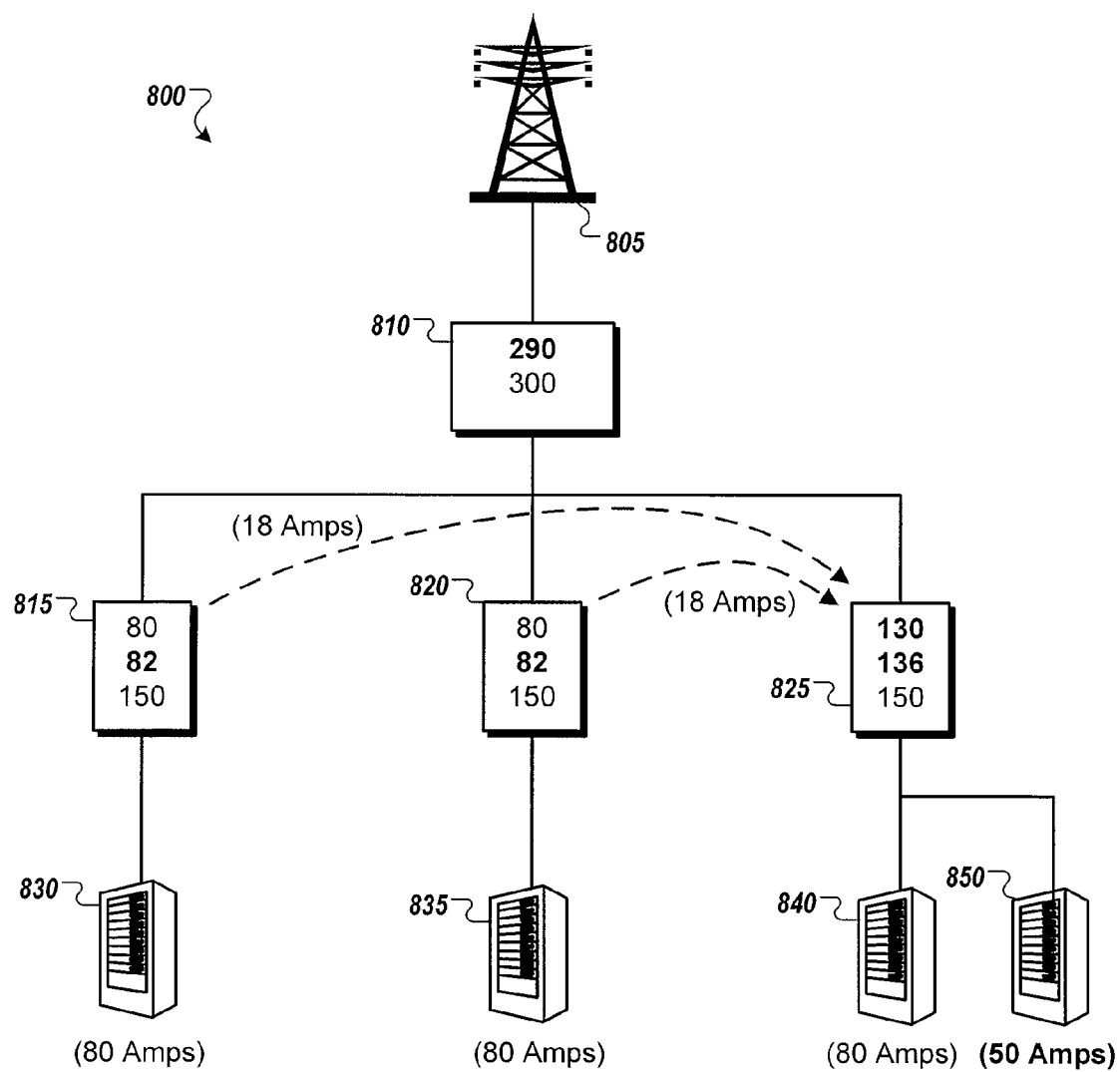

FIGS. 8A and 8B show an example power distribution system that dynamically allocates power due to changes in power load. FIG. 8A shows an example system 800 that receives power from a utility 805. In the illustrated example, the utility 805 is capable of supplying 300 A to the system 800. An over-current protection device 810 limits and distributes the power to an IPM 815, an IPM 820, and an IPM 825. The IPM 815 provides over-current protection to an electrical load 830 (e.g., a rack of computing equipment). Likewise, the IPM 820 protects an electrical load 835, and the child IPM 825 protects an electrical load 840.

In the illustrated example, the IPMs 815-825 each pass 80 A, are allocated 100 A, and have a device rating of 150 A apiece. In this configuration, the IPMs 815-825 are allocated a total of 300 A, and pass a total of 240 A to the electrical loads 830-840. The over-current protection device 810 has a device rating of 300 A, which both satisfies the total amperage allocated to the IPMs 815-825 and limits the draw to the 300 A limit that the utility 805 can provide. The over-current protection device 810 passes the 240 A total drawn by the electrical loads 830-840.

FIG. 8B shows the system 800 with an additional electrical load 850. The additional electrical load 850 is connected to the IPM 825 in parallel with the electrical load 840, and draws an additional 50 A.

In the illustrated example, the IPM 825 now needs to pass a total of 130 A to satisfy the current draw of the electrical loads 840 and 850. The 130 A is in excess of the 100 A originally allocated to the IPM 825 in FIG. 1, but is still below its own 150 A device rating. The IPM 825 negotiates with the IPMs 815 and 820 to obtain allocations of the IPMs' 815 and 820 excess capacity.

The IPMs 815 and 820 reduce their own allocations by 18 A apiece, leaving 2 A of excess capacity remaining for each. In some implementations, the IPMs 815-825 can request excess capacity. As in the illustrated example, the IPM 825 needed to obtain a total of 30 A from the IPMs 815 and 820 to satisfy the total 130 A draw of the electrical loads 840 and 850. But instead, the IPM 825 requested and obtained a total of 36 A from the IPMs 815 and 820. In some implementations, an IPM can request allocations of capacity to create a reserve of excess capacity. For example, by requesting 6 A more than the required 130 A draw, the IPM 825 can hold the 6 A as a buffer against current spikes that may exceed the 130 A draw and cause the IPM 825 to interrupt the circuit.

In some implementations, the IPMs 815-825 can withhold excess capacity from being reallocated. As in the illustrated example, the IPMs 815 and 820 originally had 20 A of excess capacity each, but allocated 18 A each to the IPM 825, leaving 2 A of excess capacity behind for each of the IPMs 815-820. In some implementations, the IPMs 815-825 can withhold excess capacity to maintain a reserve of excess capacity. For example, by withholding 2 A while allocating capacity to the IPM 825, the IPM 815 can maintain a margin of safety against current spikes that may come from the electrical load 830.

FIGS. 9A-9D show an example dynamic power allocation among a hierarchy 900 of power distribution nodes. In general, allocation requests by lower-level IPMs in one branch of an IPM hierarchy system can be supplied by excess capacity in IPMs in another branch through a series of allocation negotiations among the nodes in a power distribution system.

Figure 9A:
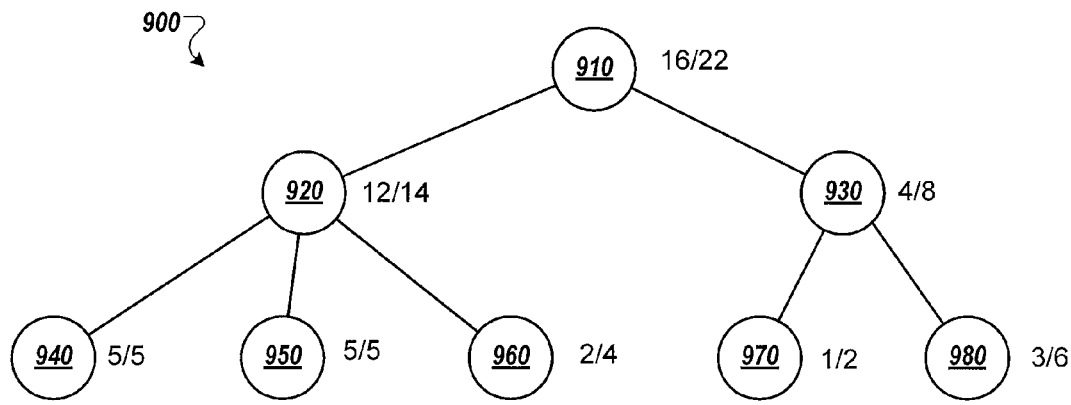
FIGS. 9A-9D show an example dynamic power allocation among a hierarchy of power distribution nodes.

FIG. 9A shows the hierarchy 900 in an initial state. The hierarchy 900 includes a top-level IPM 910 that protects and distributes power to a mid-level IPM 920 and a mid-level IPM 930. The mid-level IPM 920 protects and distributes power to a base-IPM 940, a base-IPM 950, and a base-IPM 960. The mid-level IPM 930 protects and distributes power to a base IPM 970 and a base IPM 980.

Each of the IPMs 910-980 has a corresponding measured current and allocation. For example, the top-level IPM 910 is passing 16 A out of a 22 A allocation. Each of the IPMs 910-930 distributes power to downstream IPMs, and is configured to allocate the power needed by downstream IPMs. For example, the base-level IPMs 940-960 draw a total of 12 A, and the mid-level IPM 920 is passes the 12 A of an allocated 14 A. In another example, the mid-level IPMs 920 and 930 draw a combined total of 16 A through the top-level IPM 910.

Figure 9B:
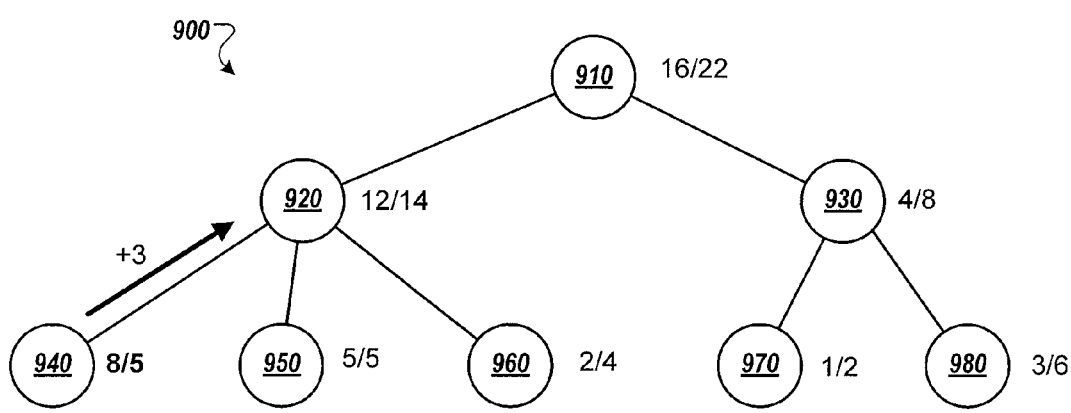

FIG. 9B shows that the base-level IPM 940 is experiencing an electrical current draw of 8 A, which is 3 A over the base-level IPM's 940 present allocation. The base-level IPM 940 sends a message to the mid-level IPM 920 to request a 3 A allocation.

Figure 9C:
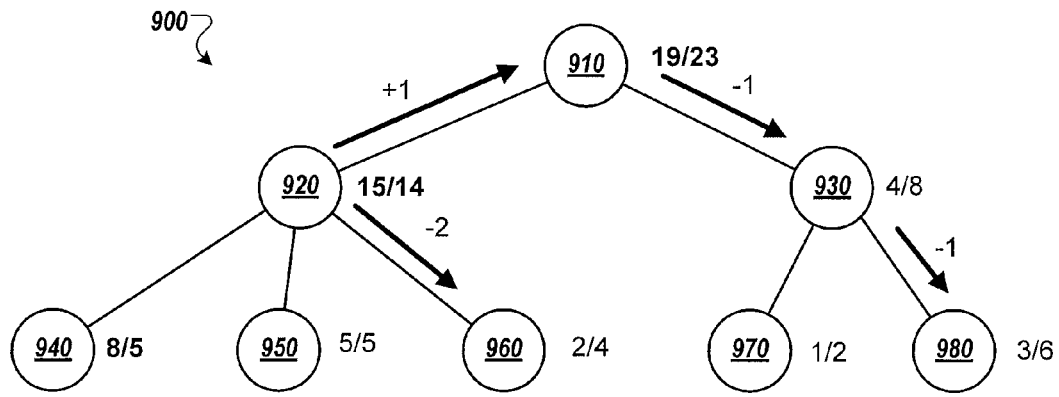

FIG. 9C shows that the current passing through the mid-level IPM 920 has been pushed to 15 A, or 1 A over its present allocation. The mid-level IPM 920 responds by requesting a reallocation of power from its downstream, base-level IPM 960 which has 2 A of excess capacity. The mid-level IPM 920 also requests a 1 A allocation from the top-level IPM 910. In some implementations, the mid-level IPM 920 can reallocate capacity allocations among the peer, base-level IPMs 940-960 before requesting an additional power allocation from the top-level IPM 910. For example, by reallocating power among the peer, base-level IPMs 940-960, the mid-level IPM 920 can increase the utilization of current presently allocated to the mid-level IPM 920, and reduce the amount of additional allocation that may be needed from the top-level IPM 910.

In some implementations, an upstream IPM can reallocate power among downstream IPMs to prevent an over-allocation of the upstream IPM. For example, the top-level IPM 910 can receive its power from a source that has a maximum output of 22 A. The top-level IPM 910 can have its allocation set to match the 22 A maximum to prevent the IPMs 920-980 from drawing more current than the 22 A source can supply.

In another example, in order to satisfy the 15 A needs of base-level IPMs 940-960, the mid-level IPM 920 needs to increase its allocation to 15 A or higher. While the total current draw through the top-level IPM 910 is now 19 A, and below the 22 A allocation, the 15 A allocation needed by the mid-level IPM 920 combined with the 8 A allocation given to the mid-level IPM 930 will total a 23 A allocation, which is higher than the 22 A allocation of the top-level IPM. The top-level 910 prevents an over-allocation by requesting that the mid-level IPM 930 reduce its allocation by 1 A. In some implementations, the mid-level IPM 930 can query downstream IPMs (e.g., the IPMs 970-980) to recover excess downstream capacity. For example, the mid-level IPM 930 can request a 1 A allocation from the base-level IPM 980. The base-level IPM 980 can respond by reducing its own allocation, which can reduce the amount of current that is needed at the mid-level IPM 930 by a substantially similar amount. By reallocating 1 A from the base-level IPM 980, and in turn reducing the mid-level IPM 930 allocation by 1 A, the theoretical draw on the top-level IPM 910 can be reduced from 23 A down to 22 A.

Figure 9D:
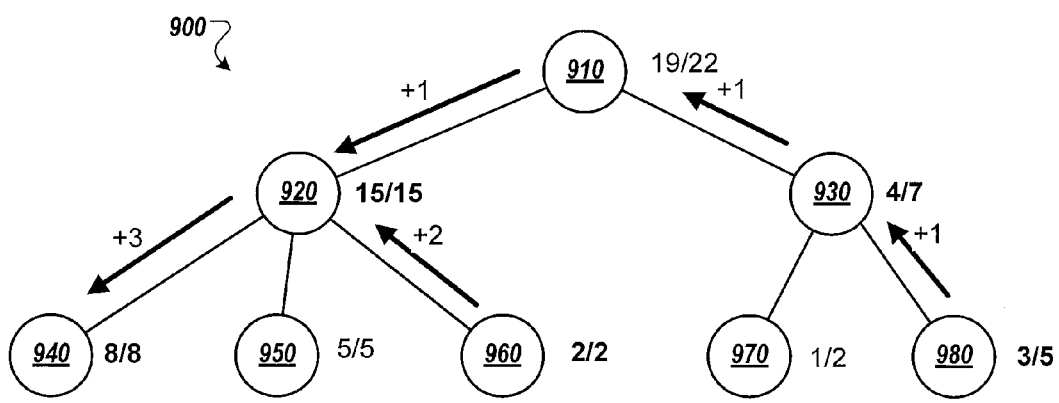

FIG. 9D shows that the base-level IPM 980 and the mid-level IPM 930 have reduced their own allocations by 1 A, and have granted that 1 A to the top-level IPM 910. The top-level IPM 910 re-allocates the 1 A to the mid-level IPM 920, which allows the IPM 920 to raise its own allocation by 1 A to a 15 A total. The reallocated 1 A is combined with the 2 A granted by the base-level IPM 960 to create a 3 A allocation that is then granted to the base-level IPM 940, allowing the base-level IPM to raise its allocation to 8 A.

Figure 10:
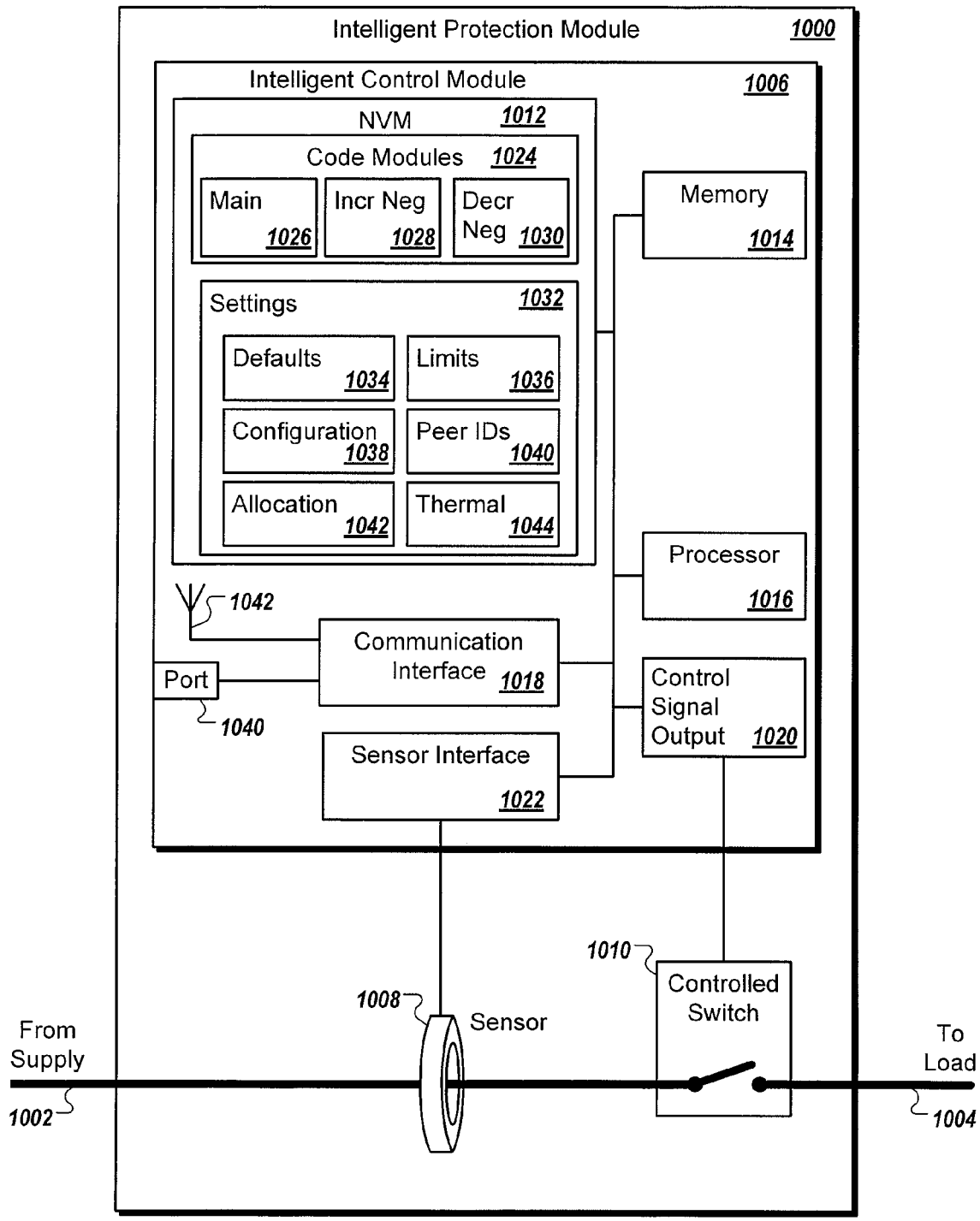
FIG. 10 shows a block diagram of an intelligent protection module.

FIG. 10 shows a block diagram of an IPM 1000. In some implementations, the IPM 1000 can be the IPMs 110a, 110b, 118a, and/or 118b of FIG. 1. The IPM 1000 receives electrical current from a supply 1002, and limits the amount of current that passes to an electrical load 1004.

The IPM 1000 includes an intelligent control module 1006, a current flow sensor 1006, and a controlled switch 1010. In some implementations, the sensor 1006 can be a transformer, a Hall Effect device, a resistor connected to a voltmeter, or other device that can output a signal that is proportional to the amount of current flowing through a conductor. In some implementations, the controlled switch 1010 can be an electromechanical or solid state relay, a remotely controllable circuit breaker, or other device that can be controlled remotely to interrupt a current path.

In general, the intelligent control module 1006 uses the sensor 1008 to measure the amount of current passing through the IPM 1000. The intelligent control module 1006 compares the measured current against a power allocation value and controls the controlled switch 1010 to optionally interrupt the current flowing to the electrical load 1004. In some implementations, the IPM 1000 can communicate with other IPMs or an information management system to raise and/or lower its allocation in response to changes in sensed current flows, requests from other IPMs and/or the information system, and/or other conditions that can cause an IPM to change its power allocation.

The intelligent control module 1006 includes a non-volatile memory (NVM) 1012, a memory 1014, a processor module 1016, a communications interface module 1018, a control signal output 1020, and a sensor interface 1022. The processor module 1016 accesses the NVM 1012 to read and execute a set of computer code modules 1024. The set of computer code modules 1024 includes a main code module 1026, an allocation increase negotiation module 1028, and an allocation decrease negotiation module 1030. Example processes performed by the code modules 1026-1030 are discussed in further detail in relation to FIGS. 2-4.

The processor module 1016 can also read a collection of settings 1026. The settings 1026 includes a collection of default settings 1028, a collection of limit values 1030, a collection of configuration settings 1032, a collection of peer identities 1034, an allocation value 1036, and a collection of thermal performance data 1038.

The collection of default settings 1034 includes values that the processor 1016 can use to run the code 1024 at startup of the IPM 1000. For example, the default settings 1034 can include a default identity of the IPM 1000, a default allocation value, and/or other information that can be used by the code 1024 if some or none of the collections 1034-1044 have been configured.

The collection of limit values 1036 includes values that describe limits such as the IPM's 1000 device rating, a minimum current flow rating, or other values that describe the performance and/or tolerance limits of the IPM 1000.

The collection of configuration values 1038 includes values such as network addresses of the IPM 1000, the information management system, or other devices. The configuration values 1038 can also include timeout, and/or device rating values (e.g., the maximum current rating of the IPM 1000). For example, the configuration values 1038 can include a value that describes the interval that the IPM 1000 should wait for a response to messages sent to other IPMs and/or the information management system before timing out. In some implementations, the IPM 1000 can time out to avoid blocking a process in the code 1024. For example, the IPM 1000 can send capacity requests and then wait 5 seconds for the responses to come back before proceeding. In some implementations, the IPM 1000 can time out to detect that the information management system is unavailable. For example, the IPM 1000 can send an allocating request to the information management system of a centrally-coordinated power distribution system and wait 10 seconds for a response before switching over to a peer-to-peer allocation negotiation process.

The collection of peer identities 1040 includes information that identifies other IPMs that are in electrical proximity to the IPM 1000. For example, the collection of peer identities 1040 can include the names and/or network addresses of the IPM that is upstream of the IPM 1000 (e.g., the parent IPM), IPMs that are downstream from the IPM 1000 (e.g., child IPMs), and/or other IPMs that derive power from the upstream IPM (e.g., sibling IPMs).

The allocation value 1042 includes a value that represents the amount of current that the IPM 1000 is allocated to pass. For example, the allocation value 1036 can be set to 100 A. When the amount of current passing through the IPM 1000 is sensed to be equal to or greater than the allocated amount, the IPM 1000 can negotiate for additional allocations and/or interrupt the current flow. In some implementations, the code 1024 can be configured to negotiate for additional allocations when the measured current is anticipated to reach the allocated value. For example, the IPM 1000 can pass 90 A of a 100 A allocation, but successive current flow measurements indicate that current usage is rising at a rate of 1 A per second. The processor 1016 and the code 1024 can be used to determine that the IPM 1000 has approximately ten seconds to preemptively request additional allocations in an attempt to avoid a possible over-current condition.

The collection of thermal performance data 1044 describes the thermal performance of the controlled switch 1010 at various amperage levels. In some implementations, the controlled switch 1010 can be run at or beyond its device rating for short periods of time without incurring damage due to the heat caused by excessive currents. For example, the controlled switch 1010 can be run indefinitely at 0% to 100% of its rating, at 105% for one second, at 110% for 0.5 second, and 115% for 0.1 second.

In some implementations, the thermal performance data 1044 can be a mathematical formula or model that can be used by the code 1024 to calculate how the IPM 1000 can tolerate short over-current conditions without incurring damage. In some implementations, the thermal performance data 1044 can be a lookup table of amperage and time data. For example, the thermal performance of the controlled switch 1010 can be estimated or measured empirically. In another example, the thermal performance of the controlled switch 1010 can be supplied by the manufacturer of the controlled switch 1010. Examples of the thermal performance data 1044 are discussed in additional detail in the description of FIG. 11.

The sensor interface 1022 receives signals from the sensor 1008 and provides an output that can be used by the processor 1016. In some examples, the sensor interface can be an analog to digital converter. For example, the sensor 1008 can output an analog signal that is proportional to the current that passes through the sensor 1008. The sensor interface 1022 converts the analog signal to a digital value that can be used by the processor 1016.

The control signal output 1020 connects the intelligent control module 1006 to the controlled switch 1010. In some implementations, the control signal output 1020 can respond to a command or signal from the processor module 1016 and output a corresponding command or signal to open and/or close the controlled switch 1010. For example, the control signal output 1020 can be a protocol converter that converts messages between the processor module's 1016 format and a communications format to which the controlled switch 1010 is configured to respond (e.g., RS232, RS422, RS485, USB, Ethernet, CAN, PROFIBUS, DeviceNet). In some implementations, the control signal output 1020 can provide a digital output that can trigger the controlled switch 1010. For example, the control signal output 1020 can receive a command from the processor module 1016 and respond by outputting a DC voltage that actuates a relay within the controlled switch 1010.

The communication interface module 1018 converts communications between a format that the processor module 1016 can use and a protocol and/or medium that can be used to communicate with other IPMs, the information management system, a user terminal, and/or other external devices. For example, the communication interface module 1018 can be a transceiver for wired and/or wireless Ethernet, power line communications, Bluetooth, ZigBee, RS232, RS422, RS485, USB, CAN, PROFIBUS, DeviceNet, and/or other protocols. The communications interface module 1018 is communicably connected to a communications port 1040 and/or an antenna 1042 that can be used to connect the communication interface module 1018 to wired and/or wireless communications media.

Figure 11:
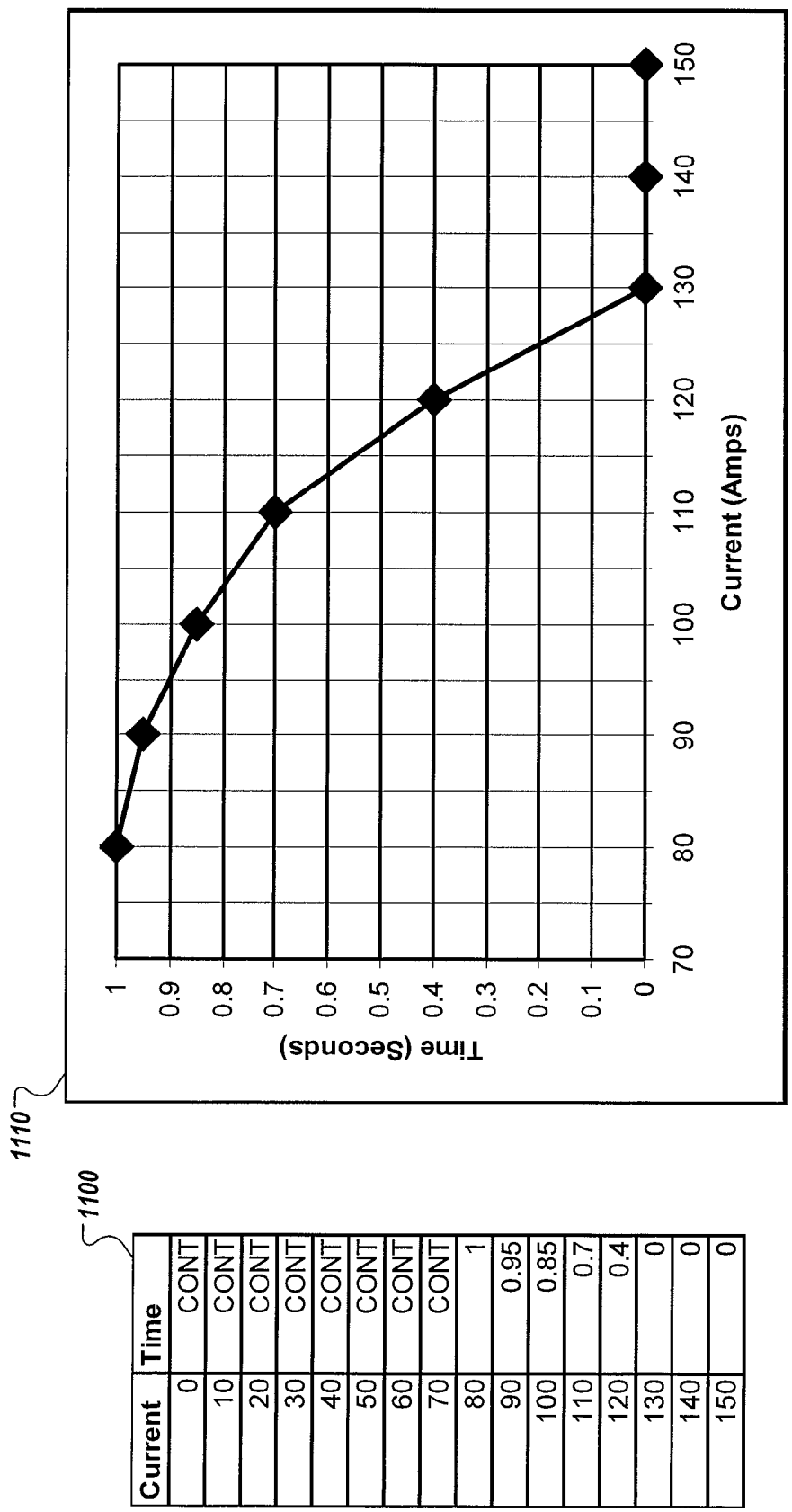
FIG. 11 shows a table and chart of an example of over-current tolerance values.

FIG. 11 shows a table 1100 and a chart 1110 of an example of over-current tolerance values. In general, electrical conductors can be driven beyond their rated continuous capacities for short periods of time substantially without experiencing adverse effects (e.g., overheating of an electrical conductor, tripping the contacts of a circuit breaker). For example, a circuit breaker can be rated to conduct 10 A of DC current continuously without tripping, but it may also be able to conduct 20 A for a tenth of a second, and/or 15 A for half a second. In general, the higher the over-current, the shorter the period of time that the over-current can be tolerated.

The table 1100 of over-current tolerance values includes a collection of time and current pairs that can describe the over-current behavior of an IPM such as the IPM 110a, 110b, 118a, or 118b of FIG. 1, or the IPM 1000 of FIG. 10. In some implementations, the time and current pairs describe a range of a current values over which the IPM can conduct substantially continuously, a range of current values over which the IPM will interrupt current flow substantially immediately, and a range of increasing current and decreasing time values that describe the durations that the IPM can conduct over-currents before interrupting current flows.

For example, the table 1100 shows that in the range of currents from 0 A to 80 A the IPM is configured to operate substantially continuously (CONT), and to trip substantially immediately for amperages of 130 A or more. In the range from 80 A to 130 A, the time and current value pairs describes the varying amounts of time that the IPM can tolerate over-currents before interrupting the current carrying circuit. For example, the table 1100 shows that the IPM is configured to conduct 90 A for 0.95 seconds before tripping. The IPM is also configured to conduct 120 A for 0.4 seconds before tripping.

In some implementations, the over-current tolerance values can be calculated by a mathematical formula or model. In some implementations, the over-current values between explicitly described values can be calculated from the explicitly described values. For example, the chart 1110 shows that by interpolating the explicitly described time values for 120 A and 130 A, an over-current of 125 A can be tolerated for 0.2 seconds. In another example, a "best fit" curve can be calculated for the current and time pairs, and can be used to calculate the amount of time the IPM can conduct various amperages before interrupting the circuit.

In some implementations, the IPM can be configured with an allocation that can be represented by collections of over-current tolerance values rather than a single point. For example, when the IPM discussed in FIG. 4 determines 406 one or more capacity values to request from one or more peer IPMs, the values can be a collection of time and current pairs such as those illustrated in the table 1100.

Figure 12:
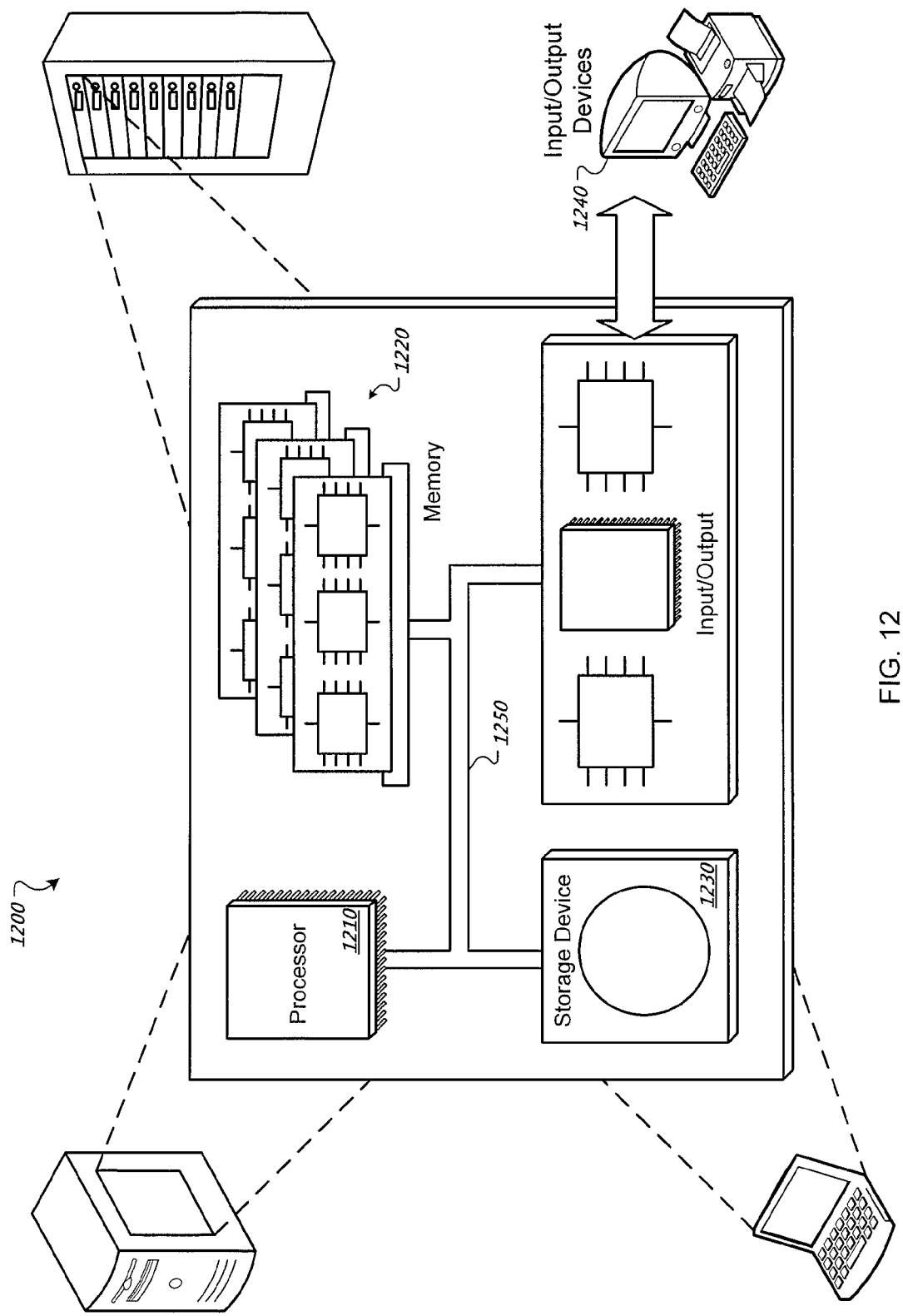
FIG. 12 is a schematic diagram of an example of a generic computer system.

FIG. 12 is a schematic diagram of an example of a generic computer system 1200. The system 1200 can be used for the operations described in association with the process 200 according to one implementation. For example, the system 1200 may be included in either or all of the IPMs 110a, 110b, 118a, and 118b, and/or the information management system 122.

The system 1200 includes a processor 1210, a memory 1220, a storage device 1230, and an input/output device 1240. Each of the components 1210, 1220, 1230, and 1240 are interconnected using a system bus 1250. The processor 1210 is capable of processing instructions for execution within the system 1200. In one implementation, the processor 1210 is a single-threaded processor. In another implementation, the processor 1210 is a multi-threaded processor. The processor 1210 is capable of processing instructions stored in the memory 1220 or on the storage device 1230 to display graphical information for a user interface on the input/output device 1240.

The memory 1220 stores information within the system 1200. In one implementation, the memory 1220 is a computer-readable medium. In one implementation, the memory 1220 is a volatile memory unit. In another implementation, the memory 1220 is a non-volatile memory unit.

The storage device 1230 is capable of providing mass storage for the system 1200. In one implementation, the storage device 1230 is a computer-readable medium. In various different implementations, the storage device 1230 may be a floppy disk device, a hard disk device, an optical disk device, or a tape device.

The input/output device 1240 provides input/output operations for the system 1200. In one implementation, the input/output device 1240 includes a keyboard and/or pointing device. In another implementation, the input/output device 1240 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Typical elements of a computer may include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

Although a few implementations have been described in detail above, other modifications are possible. In some implementations, an IPM may request excess capacity allocation as it approaches full utilization of its present capacity allocation using a tiered request approach. For example, if the IPM capacity is from 85%-90%, a request may be sent with a low-priority code. Likewise, if an IPM capacity is from 90%-95%, a request may be sent with a medium-priority code. Similarly, if an IPM capacity is from 95%-100%, a request may be sent with a high-priority code. These codes may be used by other IPMs in the system or an information system to determine whether or not to grant a request.

A number of embodiments have been described. Nevertheless, it will be understood that various modifications may be made. For example, advantageous results may be achieved if the steps of the disclosed techniques were performed in a different sequence, if components in the disclosed systems were combined in a different manner, or if the components were replaced or supplemented by other components. Accordingly, other embodiments are within the scope of the following claims.

What is claimed is:

1. A current limiting device for operation in a dynamic current allocation system having a plurality of current limiting devices on a supply branch, the device comprising:
   a current sensor arranged to sense a current level through a first load branch;
   a current interrupter to limit the current level through the first load branch according to a first load branch current allocation setting;
   a communication interface to automatically communicate messages with one or more other current limiting devices on the supply branch relating to the sensed current level and sensed current levels on one or more other load branches;
   memory storing instructions to negotiate adjustments to the first load branch current allocation setting, the negotiation being made with the one or more other current limiting devices configured to limit a corresponding one or more other load branch currents according to corresponding one or more other load branch current allocation settings, wherein a result of the negotiation yields an allocation of the first and one or more of the other load branch current allocation settings such that the current limiting device and the one or more other current limiting devices maintain a supply branch current substantially at or below a predetermined available current capacity of the supply branch; and
   a processor operatively coupled to execute the instructions stored in the memory to control the current interrupter and the communication interface.

2. The device of claim 1, wherein the memory receives a message from a requesting current limiting device of the one or more other current limiting devices, the message including a request to reallocate at least one of the first and one or more other load branch current allocation settings among the current limiting device and the one or more other current limiting devices.

3. The device of claim 2, wherein the processor determines whether to allocate a portion of available excess current capacity in the first load branch of the current limiting device to the requesting current limiting device.

4. The device of claim 3, wherein the processor generates a response message indicating the portion of available excess capacity to allocate to the requesting current limiting device.

5. The device of claim 4, wherein the response message indicates an agreement to reduce at least a portion of the branch allocation setting for the first load branch.

6. The device of claim 1, wherein the memory stores a lookup table with the first load branch current allocation setting.

7. The device of claim 1, wherein the current interrupter limiting current to an allocation setting comprises interrupting the first load branch current.

8. The device of claim 1, wherein the current interrupter decreases the first load branch current allocation setting on a timed interval if the sensed current level does not exceed the allocation setting.

9. A power distribution system for dynamically allocating current based on communication among a plurality of current limiting devices, the system comprising:
   an electrical branch carrying a varying branch current;
   a plurality of current limiting devices on the electrical branch, wherein the plurality of current limiting devices each control a current in a sub-branch of the electrical branch;
   a plurality of current sensors, wherein each of the plurality of current sensors is associated with one of the plurality of current limiting devices to sense a current level on a sub-branch associated with the one of the current limiting devices; and a plurality of current determination modules, wherein each of the plurality of current determination modules is associated with one of the plurality of current limiting devices to determine a set-point current by communicating information about current needs with others of the plurality of current determination modules.

10. The system of claim 9, wherein the plurality of current determination modules are programmed to maintain a total electrical branch current substantial at or below a predetermined threshold.

11. The system of claim 9, further comprising a central control module to monitor operations of the plurality of current determination modules and to determine a total maximum electrical branch current for the electrical branch.

12. The system of claim 9, wherein one of the plurality of current determination modules including the two or more downstream branches detects excess capacity from the two or more downstream branches.

13. The system of claim 12, wherein the one of the plurality of current determination modules requests an allocation from the two or more downstream branches.

14. The system of claim 9, wherein the plurality of current protecting modules communicate with an information management system, the information management system including a database that stores and retrieves information relating to each current protecting module.

15. The system of claim 14, wherein the information management system performs the following operations:

determining a need, at a first current protection module that controls current on a sub-branch of an electrical branch, for current capacity;

communicating the need for current capacity to one or more other current protection modules on the electrical branch; and receiving responses from the one or more other current protection modules, wherein the responses indicate that the one or more other current protection modules will limit current on sub-branches associated with the one or more other current protection modules so as to permit the first current protection module to allow the current capacity while maintaining a current level for the branch substantially at or below a determined current level.

16. The system of claim 15, wherein the operations further comprise, before determining the need for current capacity, selecting a current level available to a first branch is determined initially assigning each branch an equal amount of current.

17. The system of claim 15, wherein the operations further comprise denying the request for the change in the first load branch current allocation setting.

18. The system of claim 15, wherein the operations further comprise determining whether to allocate a portion of the available excess capacity.

* * * * *